(12) United States Patent
Nishikata et al.

(10) Patent No.: US 11,115,127 B2
(45) Date of Patent: Sep. 7, 2021

(54) LASER COMMUNICATION SYSTEM AND LASER COMMUNICATION METHOD

(71) Applicant: MITSUBISHI HEAVY INDUSTRIES, LTD., Tokyo (JP)

(72) Inventors: Shingo Nishikata, Tokyo (JP); Hiroshi Arakawa, Tokyo (JP); Yoshikatsu Kuroda, Tokyo (JP); Hiroshi Ikebuchi, Tokyo (JP); Yukito Hata, Tokyo (JP); Yuichi Araki, Tokyo (JP); Koichi Hamamoto, Tokyo (JP); Tomoya Morioka, Tokyo (JP); Atsushi Ochiai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/327,001

(22) PCT Filed: Feb. 10, 2017

(86) PCT No.: PCT/JP2017/004907
§ 371 (c)(1),
(2) Date: Feb. 21, 2019

(87) PCT Pub. No.: WO2018/087938
PCT Pub. Date: May 17, 2018

(65) Prior Publication Data
US 2019/0215076 A1 Jul. 11, 2019

(30) Foreign Application Priority Data
Nov. 9, 2016 (JP) ................................ 2016-219126

(51) Int. Cl.
*H04B 10/00* (2013.01)
*H04B 10/50* (2013.01)
(Continued)

(52) U.S. Cl.
CPC ......... *H04B 10/505* (2013.01); *H01S 3/0071* (2013.01); *H01S 3/0085* (2013.01); *H04W 8/24* (2013.01)

(58) Field of Classification Search
CPC ... H04B 10/112; H04B 10/114; H04B 10/116; H04B 10/1123; H04B 10/1143;
(Continued)

(56) References Cited

U.S. PATENT DOCUMENTS

| 5,200,631 | A | 4/1993 | Austin et al. | |
|---|---|---|---|---|
| 6,381,055 | B1 * | 4/2002 | Javitt | H04B 10/1123 398/131 |

(Continued)

FOREIGN PATENT DOCUMENTS

| GB | 1136032 | 12/1968 |
|---|---|---|
| JP | 05-211283 | 8/1993 |

(Continued)

OTHER PUBLICATIONS

International Search Report dated Apr. 18, 2017 in International (PCT) Application No. PCT/JP2017/004907.

(Continued)

*Primary Examiner* — Hanh Phan
(74) *Attorney, Agent, or Firm* — Wenderoth, Lind & Ponack, L.L.P.

(57) ABSTRACT

A solid obstacle is removed with a high-power laser beam to establish a transmission path for a spatial laser communication. When a space in which the laser beam is transmitted is blocked off by the solid obstacle, the spatial laser communication cannot be carried out.

16 Claims, 24 Drawing Sheets

(51) Int. Cl.
*H04W 8/24* (2009.01)
*H01S 3/00* (2006.01)

(58) Field of Classification Search
CPC  H04B 10/1149; H04B 10/505; H04B 10/118; H04B 10/40; H04B 10/43; H01S 3/0071; H01S 3/0085
USPC ....... 398/118, 119, 124, 127, 128, 129, 130, 398/131, 135, 136, 164, 183, 202, 208, 398/158, 159, 120; 372/32, 34, 36, 372/38.02; 385/88, 89, 90, 92, 93
See application file for complete search history.

(56) References Cited

U.S. PATENT DOCUMENTS

| | | | |
|---|---|---|---|
| 7,627,249 | B1 | 12/2009 | Izadpanah et al. |
| 7,751,716 | B2 * | 7/2010 | Killinger .............. H04B 10/506 398/118 |
| 8,908,720 | B2 | 12/2014 | Nishikata et al. |
| 2014/0153592 | A1 | 6/2014 | Nishikata et al. |
| 2016/0254865 | A1 | 9/2016 | Hening et al. |

FOREIGN PATENT DOCUMENTS

| | | |
|---|---|---|
| JP | 3626807 | 3/2005 |
| JP | 2012-039285 | 2/2012 |
| JP | 2014-109412 | 6/2014 |

OTHER PUBLICATIONS

International Preliminary Report on Patentability and Written Opinion of the International Searching Authority dated May 14, 2019 in International ([PCT) Application No. PCT/JP2017/004907.
Extended European Search Report dated Aug. 16, 2019 in corresponding European Patent Application No. 17870578.6.

* cited by examiner

LASER COMMUNICATION SYSTEM AND LASER COMMUNICATION METHOD

TECHNICAL FIELD

The present invention relates to a laser communication system and a laser communication method.

Background Art

The studies and development of a free-space optical communication are accomplished in which a laser beam is transmitted in a space for communication. The free-space optical communication is applicable to a communication between a base station on the ground and an artificial satellite and a communication between buildings as an example.

A spatial laser communication has excellent advantages in communication speed and confidentiality of communicating data. On the other hand, since a laser beam is transmitted in the space in principle, the spatial laser communication cannot be carried out when an obstacle exists in the transmission path.

The obstacle is not always necessary to block the laser beam and makes it difficult to secure a S/N (signal/noise) ratio requested for the communication.

As a candidacy of such an obstacle, water droplets or minute particles to scatter, refract and attenuate a laser beam are thought of in addition to a solid material. The water droplets exist in air in the form of fog and cloud. The minute particles exist in the floating form in the atmosphere.

In relation to the above, Patent Literature 1 (Japanese Patent No. 3, 626,807) discloses a system that vaporizes and removes the water droplets in the transmission path by a pulse laser beam to start the spatial laser communication.

The system of Patent Literature 1 does not consider the removal of a solid obstacle. Also, the use of a pulse laser beam is assumed for removal of an obstacle of water droplets. The pulse laser beam is difficult to improve an average output, and is not suitable for removal of the solid obstacle.

On the other hand, recently, the research of a high-power laser system is accomplished that fuses and destroys an object situated on a long distance of about several kilometers to 100 kilometers. However, a high-speed modulation of the high-power laser beam is difficult, and therefore, it is difficult to use for communication just as it is.

CITATION LIST

Patent Literature

[Patent Literature 1] Japanese Patent No. 3,626,807

SUMMARY OF THE INVENTION

The laser beam communication is carried out by removing a solid obstacle which blocks off a space as a transmission path of a laser beam. Another problem and new features will become clear from the description of this Specification and the attached drawings.

According to an embodiment, a laser communication system includes a high-power laser oscillator configured to generate a high-power laser beam to remove a solid obstacle.

According to an embodiment, a laser beam communication method includes removing a solid obstacle with a high-power laser beam; and carrying out a laser beam communication through a space which had been blocked off by the removed solid obstacle.

According to the embodiment, the obstacle is removed by the high-power laser beam and it is possible to communicate in the laser beam.

DESCRIPTION OF EMBODIMENTS

Referring to the attached drawings, embodiments of a laser communication system and a laser beam method according to the present invention will be described below.

First Embodiment

Figure 1A:
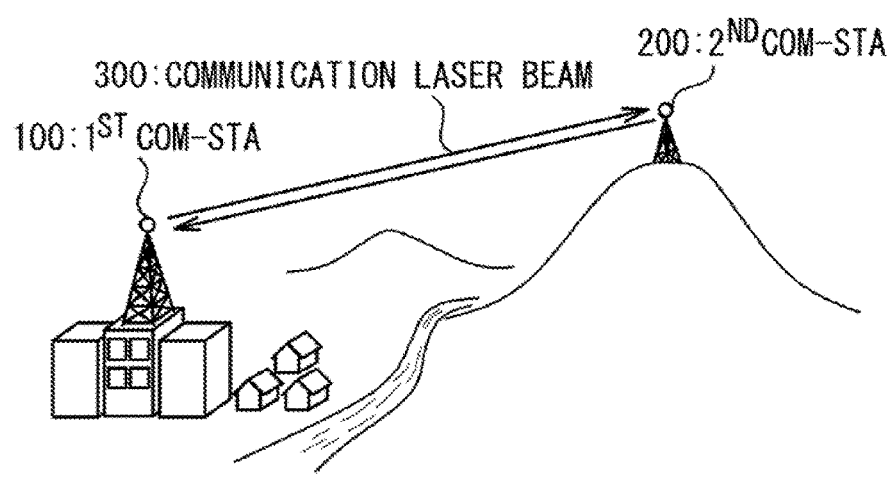
FIG. 1A is a diagram showing a configuration example of a laser communication system according to an embodiment.

A basic principle of a laser communication system and a laser communication method according to a first embodiment will be described. FIG. 1A is a diagram showing a configuration example of the laser communication system according to an embodiment. In an example of FIG. 1A, a spatial laser communication is carried out by sending and receiving a communication laser beam 300 between a first communication station ($1^{st}$ COM-STA) 100 and a second communication station ($2^{nd}$ COM-STA) 200.

Figure 1B:
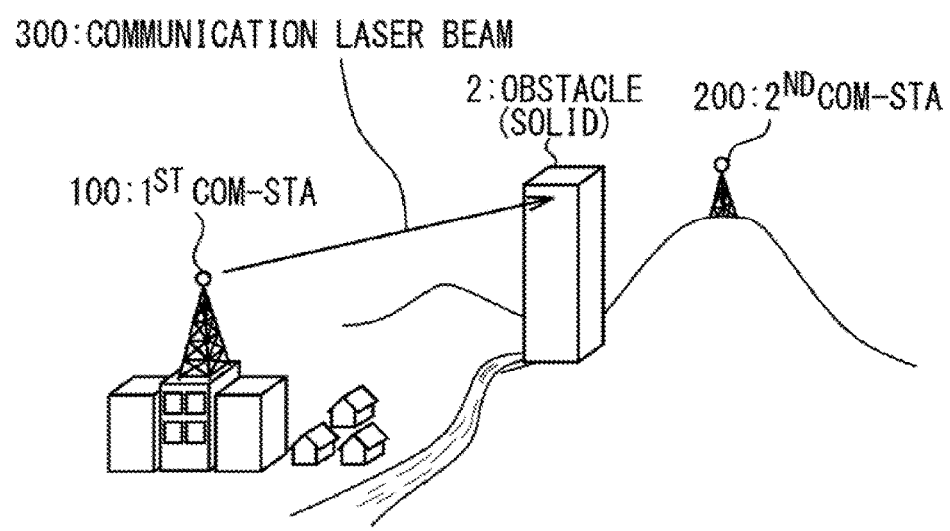
FIG. 1B is a diagram showing an example of state that the laser communication according to the embodiment is blocked by an obstacle.

FIG. 1B is a diagram showing an example of state that the laser communication according to an embodiment is blocked off by solid obstacle 2. When the solid obstacle 2 exists in a space where the communication laser beam (COM-LB) 300 is transmitted, the obstacle 2 must be removed because the communication laser beam 300 cannot be transmitted between the first communication station 100 and the second communication station 200.

Figure 1C:
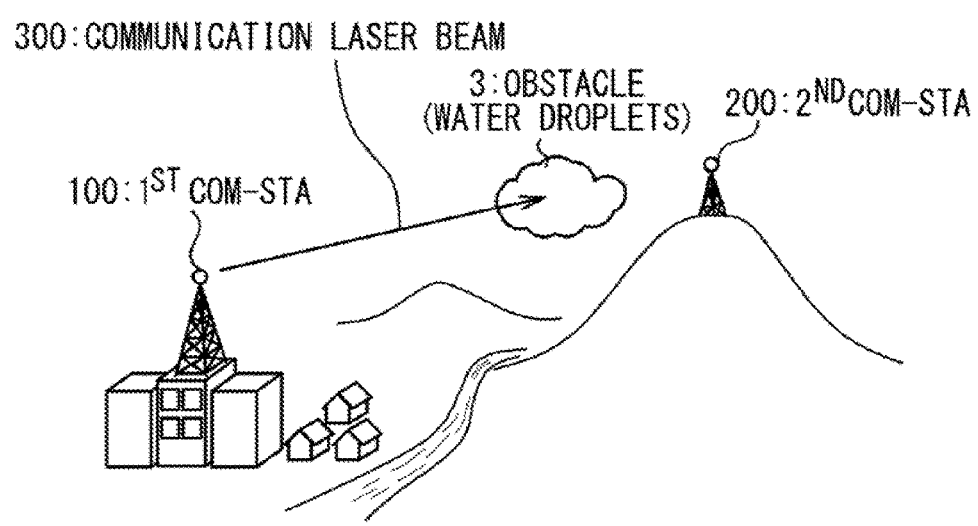
FIG. 1C is a diagram showing an example of state that the laser communication according to the embodiment is blocked by an obstacle of water droplets.

FIG. 1C is a diagram showing an example of state that a channel of the laser communication system according to an embodiment is blocked off by an obstacle 3 of water droplets. When the obstacle 3 of water droplets exists in a space where the communication laser beam 300 is transmitted, the obstacle 2 must be removed, because the communication laser beam 300 is not transmitted between the first communication station 100 and the second communication station 200.

Figure 2:
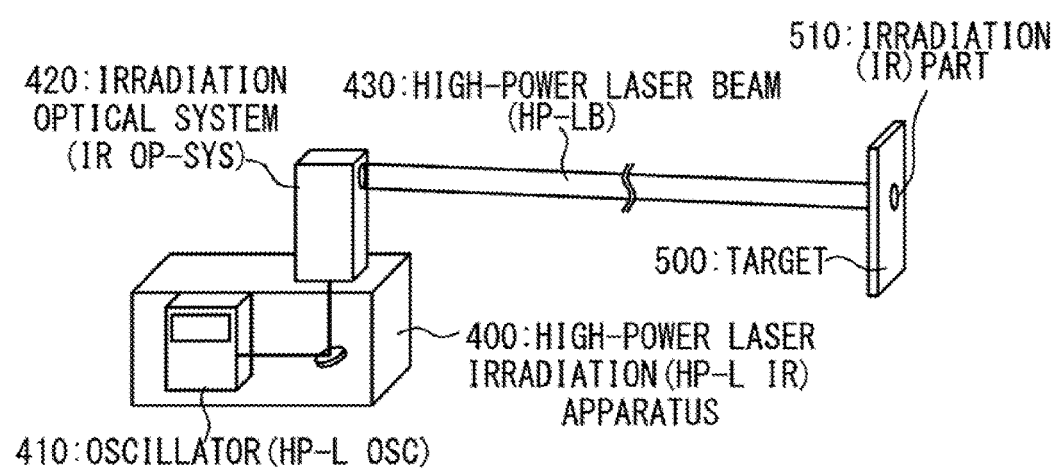
FIG. 2 is a diagram showing the principle in which a target is removed with a high-power laser.

In the laser communication system and the laser communication method according to an embodiment, a high-power laser beam is used to establish a transmission path through the obstacle 2. FIG. 2 is a diagram showing the principle in which a target 500 is removed with a high-power laser beam 430. In an example of FIG. 2, regarding the target 500 as the obstacle 2, the high-power laser beam (HP-LB) 430 is irradiated from a high-power laser irradiation (HP-L IR) apparatus 400 to the target 500. The high-power laser irradiation apparatus 400 uses a high-power laser oscillator (HP-L OSC) 410 to generate the high-power laser beam 430, and sets the irradiation direction of the high-power laser beam 430 to the target 500 by using an irradiation optical system (IR OP-SYS) 420. A part of the target 500 where the high-power laser beam 430 is irradiated is called an irradiation (IR) part 510. When the high-power laser beam 430 is irradiated, part or whole of the target 500 is removed. At this time, the part or whole of the target 500 may be fused or destroyed. It is necessary that the target 500 is removed from a space where a communication laser beam is transmitted or that the signal-to-noise ratio necessary to communicate is secured. For example, in case of the obstacle through which the communication laser beam can be transmitted in a predetermined output level, it is necessary that the obstacle can be made thin to an extent that the necessary signal-to-noise ratio is secured. Note that the high-power laser beam 430 can remove the obstacle 3 of water droplets.

As the high-power laser beam 430 which penetrates through the obstacle 2, a continuous-wave laser beam outputted continuously is more suitable than a pulse laser beam in a pulse. For example, such a continuous-wave laser beam is realized by a solid-state laser.

Figure 3:
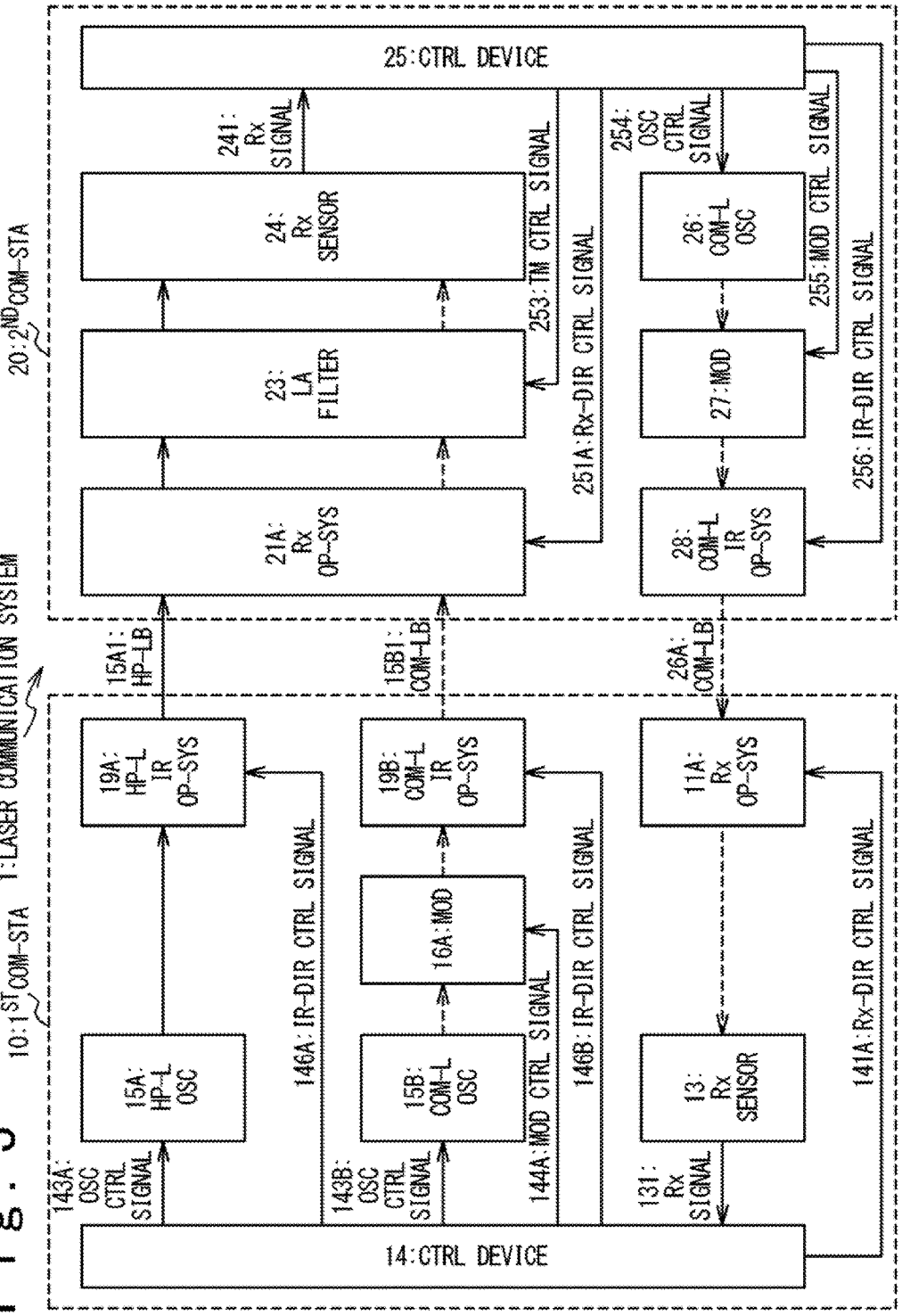
FIG. 3 is a block circuit diagram showing a configuration example of a laser communication system according to a first embodiment.

FIG. 3 is a block circuit diagram showing a configuration example of the laser communication system 1 according to a first embodiment. The components of the laser communication system 1 shown in FIG. 3 will be described.

The laser communication system 1 shown in FIG. 3 includes a first communication station ($1^{st}$ COM-STA) 10 and a second communication station ($2^{nd}$ COM-STA) 20. The first communication station 10 includes a reception optical system (Rx OP-SYS) 11A, a reception (Rx) sensor 13, a control (CTRL) device 14, a high-power laser oscillator (HP-L OSC) 15A, a communication laser oscillator (COM-L OSC) 15B, a modulator (MOD) 16A, a high-power laser irradiation optical system (HP-L IR OP-SYS) 19A, and a communication laser irradiation optical system (COM-L IR OP-SYS) 19B. The second communication station 20 includes a reception optical system (Rx OP-SYS) 21A, a light-attenuating (LA) filter 23, a reception (Rx) sensor 24, a control (CTRL) device 25, a communication laser oscillator (COM-L OSC) 26, a modulator (MOD) 27, a communication laser irradiation optical system (COM-L IR OP-SYS) 28.

An optical connection relation of components of the laser communication system 1 of FIG. 3 will be described. The optical connection relation which will be described here includes connections through various optical parts such as a mirror, a lens and a beam splitter (not shown). The high-power laser irradiation optical system 19A is arranged in the subsequent stage of the high-power laser oscillator 15A. In other words, a high-power laser beam (HP-LB) 15A1 generated by the high-power laser oscillator 15A is outputted to the high-power laser irradiation optical system 19A.

The reception optical system 21A is arranged in the subsequent stage of the high-power laser irradiation optical system 19A. In other words, the high-power laser beam 15A1 irradiated from the high-power laser irradiation optical system 19A is outputted to the reception optical system 21A.

The communication laser irradiation optical system 19B is arranged in the subsequent stage of the communication laser oscillator 15B through the modulator (MOD) 16A. In other words, a communication laser beam (COM-LB) 15B1 generated by the communication laser oscillator 15B is modulated by the modulator 16A, and then is supplied to the communication laser irradiation optical system 19B.

The reception optical system 21A is arranged in the subsequent stage of the communication laser irradiation optical system 19B. In other words, the communication laser beam 15B1 irradiated from the communication laser irradiation optical system 19B is supplied to the reception optical system 21A.

The reception sensor 24 is arranged in the subsequent stage with the reception optical system 21A through the light-attenuating filter 23. In other words, the high-power laser beam (HP-LB) 15A1 and the communication laser beam (COM-LB) 15B1 emitted from the reception optical system 21A are attenuated by the light-attenuating filter 23, and are supplied to the reception (Rx) sensor 24. As described later, the transmittance of the light-attenuating filter 23 is variable, and it is desirable that the control is carried out such that the transmittance becomes farther lower when the high-power laser beam 15A1 passes through the light-attenuating filter 23 and becomes higher when the communication laser beam 15B1 passes through the light-attenuating filter 23. Or, the light-attenuating filter 23 is configured by stacking a plurality of light-attenuating sub filters, and the transmittance of the light-attenuating filter 23 may be adjusted based on the number and the combination of the light-attenuating sub filters to be stacked. In this case, a drive system may be provided to change the number and the combination of the light-attenuating sub filters to be stacked. Moreover, as another configuration, for example, the light-attenuating filter 23 may be configured to have a different transmittance depending on a place through which the laser beam passes. In this case, a drive system may be provided to move the light-attenuating filter 23 to adjust the place through which the laser beam passes.

The communication laser irradiation optical system (COM-L IR OP-SYS) 28 is arranged in the subsequent stage of the communication laser oscillator (COM-L OSC) 26 through the modulator (MOD) 27. In other words, the communication laser beam (COM-LB) 26A emitted from communication laser oscillator 26 is modulated by the modulator 27 and then outputted to the communication laser irradiation optical system 28.

The reception optical system (Rx OP-SYS) 11A is arranged in the subsequent stage of the communication laser irradiation optical system 28. In other words, the communication laser beam (COM-LB) 26A irradiated from the communication laser irradiation optical system 28 is outputted to the reception optical system 11A.

The reception (Rx) sensor 13 is arranged in the subsequent stage of the reception optical system 11A. In other words, the communication laser beam 26A emitted from the reception optical system 11A is supplied to the reception sensor 13.

An electrical connection relation of components of the laser communication system 1 of FIG. 3 will be described. In the first communication station 10, the control (CTRL) device 14 is electrically connected with the reception optical system 11A, the reception sensor 13, the high-power laser oscillator (HP-L OSC) 15A, the high-power laser irradiation optical system (HP-L IR OP-SYS) 19A, the communication laser oscillator 15B, the modulator 16A and the communication laser irradiation optical system (COM-L IR OP-SYS) 19B. In the second communication station 20, the control device 25 is connected with the reception optical system 21A, the light-attenuating filter 23, the reception sensor 24, the communication laser oscillator 26, the modulator 27, and the communication laser irradiation optical system 28.

The operation of the laser communication system 1 of FIG. 3 will be described.
(Control when First Communication Station 10 Receives Communication Laser Beam)

In the first communication station 10, the control device 14 generates a reception direction control signal 141A to control the reception direction. The control device 14 transmits the reception direction control signal 141A to the reception optical system 11A. The reception optical system 11A receives the reception direction control signal 141A. Therefore, the reception optical system 11A adjusts the reception direction according to the reception direction control (Rx-DIR CTRL) signal 141A. In this case, the reception direction of the reception optical system 11A is desirable to be adjusted to a direction in which the incident precision of the communication laser beam 26A irradiated from the communication laser irradiation optical system 28 has a maximum value.

The reception optical system 11A receives the communication laser beam 26A from the communication laser irradiation optical system 28 and transmits to the reception sensor 13. The reception sensor 13 receives the communication laser beam 26A from the reception optical system 11A and generates a reception (Rx) signal 131 by converting the communication laser beam 26A. The reception sensor 13 transmits the reception signal 131 to the control device 14. In this case, the reception sensor 13 may transmit to the control device 14, a signal which contains data for feedback control according to the incident precision of the communication laser beam 26A.
(Control when First Communication Station 10 Emits Communication Laser Beam)

The control device 14 generates an oscillation control (OSC CTRL) signal 143B to generate the communication laser beam 15B1. The control device 14 transmits the oscillation control signal 143B to the communication laser oscillator 15B. The communication laser oscillator 15B receives the oscillation control signal 143B. The communication laser oscillator 15B generates the communication laser beam 15B1 according to the oscillation control signal 143B. The communication laser oscillator 15B emits the communication laser beam 15B1 to the modulator 16A. The modulator 16A receives the communication laser beam 15B1.

The control device 14 generates a modulation control (MOD CTRL) signal 144A to control the modulation of the communication laser beam 15B1. In this case, transmission data to be transmitted to the second communication station 20 by the communication laser beam 15B1 is contained in the modulation control signal 144A in a predetermined data format. The control device 14 transmits the modulation control signal 144A to the modulator 16A. The modulator 16A receives the modulation control signal 144A. Therefore, the modulator 16A modulates the communication laser beam 15B1 according to the modulation control signal 144A. The modulator 16A emits the modulated communication laser beam 15B1 to the communication laser irradiation optical system 19B. The communication laser irradiation optical system 19B receives the communication laser beam 15B1.

The control device 14 generates an irradiation direction control (IR-DIR CTRL) signal 146B to control the irradiation direction of the communication laser beam 15B1. The control device 14 transmits the irradiation direction control signal 146B to the communication laser irradiation optical system 19B. The communication laser irradiation optical system 19B receives the irradiation direction control signal 146B. The communication laser irradiation optical system 19B adjusts the irradiation direction of the communication laser beam 15B1 according to the irradiation direction control signal 146B. Here, it is desirable that the irradiation direction of the communication laser irradiation optical system 19B is adjusted to the direction of the reception optical system 21A of the second communication station 20 basically. The communication laser irradiation optical system 19B irradiates the communication laser beam 15B1 to the adjusted irradiation direction.

(Control when First Communication Station 10 Emits High-Power Laser Beam)

The control device 14 generates an oscillation control (OSC CTRL) signal 143A to generate the high-power laser beam 15A1. The control device 14 transmits the oscillation control signal 143A to the high-power laser oscillator 15A. The high-power laser oscillator 15A receives the oscillation control signal 143A. Therefore, the high-power laser oscillator 15A generates the high-power laser beam 15A1 in response to the oscillation control signal 143A. The high-power laser oscillator 15A emits the high-power laser beam 15A1 to the high-power laser irradiation optical system 19A. The high-power laser irradiation optical system 19A receives the high-power laser beam 15A1.

The control device 14 generates an irradiation direction control (IR-DIR CTRL) signal 146A to control the irradiation direction of the high-power laser beam 15A1. The control device 14 transmits the irradiation direction control signal 146A to the high-power laser irradiation optical system 19A. The high-power laser irradiation optical system 19A receives the irradiation direction control signal 146A. Therefore, the high-power laser irradiation optical system 19A adjusts the irradiation direction of the high-power laser beam 15A1 according to the irradiation direction control signal 146A. In this case, it is desirable that the irradiation direction of the high-power laser irradiation optical system 19A is adjusted such that the high-power laser beam 15A1 is irradiated to a part of the obstacle 2 which blocks off a transmission path of the communication laser beam 15B1 to be transmitted from the communication laser irradiation optical system 19B to the reception optical system 21A. Basically, the irradiation direction of the high-power laser irradiation optical system 19A is adjusted to a direction in which the high-power laser beam 15A1 heads for the reception optical system 21A. For this purpose, it is desirable that the optical axis of the high-power laser beam 15A1 irradiated from the high-power laser irradiation optical system 19A is arranged to be sufficiently near to the optical axis of the communication laser beam 15B1 irradiated from the communication laser irradiation optical system 19B. The high-power laser irradiation optical system 19A irradiates the high-power laser beam 15A1 to the adjusted irradiation direction.

(Control when Second Communication Station 20 Receives Communication Laser Beam)

In the second communication station 20, the control device 25 generates a reception direction control (Rx-DIR CTRL) signal 251A to control the reception direction. The control device 25 transmits the reception direction control signal 251A to the reception optical system 21A. The reception optical system 21A receives the reception direction control signal 251A. Therefore, the reception optical system 21A adjusts the reception direction according to the reception direction control signal 251A. In this case, it is desirable that the reception direction of the reception optical system 21A is adjusted to the direction in which the incident precision of the communication laser beam 15B1 irradiated from the communication laser irradiation optical system 19B has a maximum value. The reception optical system 21A receives the high-power laser beam 15A1 or the communication laser beam 15B1 from the adjusted reception direction. The reception optical system 21A emits the high-power laser beam 15A1 or the communication laser beam 15B1 to the reception sensor 24 through the light-attenuating filter 23.

The control device 25 generates a transmittance control (TM CTRL) signal 253 to control the variable transmittance of the light-attenuating filter 23. The control device 25 transmits the transmittance control signal 253 to the light-attenuating filter 23. The light-attenuating filter 23 receives the transmittance control signal 253. Therefore, the light-attenuating filter 23 adjusts its own transmittance according to the transmittance control signal 253. In this case, when the high-power laser beam 15A1 is irradiated from the first communication station 10, it is desirable that the transmittance of the light-attenuating filter 23 is adjusted to be low or dropped to protect the reception sensor 24 from the high-power laser beam 15A1. Oppositely, when the high-power laser beam 15A1 is not irradiated from the first communication station 10, it is desirable that the transmittance of the light-attenuating filter 23 is adjusted to be high such that the reception sensor 24 can receive the communication laser beam 15B1 precisely. More specifically, the light-attenuating filter 23 may be exchanged, the number of light-attenuating sub filters to be stacked may be decreased, the combination of the light-attenuating sub filters to be stacked may be changed, or the place of the light-attenuating filter 23 through which the laser beam passes may be changed.

The reception sensor 24 receives the high-power laser beam 15A1 or the communication laser beam 15B1 emitted from the reception optical system 21A and then attenuated by the light-attenuating filter 23. The reception sensor 24 converts the received laser beam to generate a reception (Rx) signal 241. The reception sensor 24 transmits the reception signal 241 to the control device 25. Here, when the communication laser beam 15B1 is received, the reception sensor 24 may transmit to the control device 25, a signal which contains data for the feedback control according to the incident precision of the communication laser beam 26A, together with the laser beam 15B1. Also, when the high-power laser beam 15A1 is received, the reception sensor 24 may transmit a signal which contains the reception intensity data of the laser beam 15A1 to the control device 25 as the reception signal 241.

(Control when Second Communication Station 20 Emits Communication Laser Beam)

The control device 25 generates an oscillation control (OSC CTRL) signal 254 to generate the communication laser beam 26A. The control device 25 transmits the oscillation control signal 254 to the communication laser oscillator 26. The communication laser oscillator 26 receives the oscillation control signal 254. Therefore, the communication laser oscillator 26 generates the communication laser beam 26A in response to the oscillation control signal 254. The communication laser oscillator 26 emits the communication laser beam 26A to the modulator 27. The modulator 27 receives a communication laser beam 26A.

The control device 25 generates a modulation control (MOD CTRL) signal 255 to modulate the communication laser beam 26A. Here, the transmission data to be transmitted on the communication laser beam 26A to the first communication station 10 is contained in the modulation control signal 255 in a predetermined data format. The control device 25 transmits the modulation control signal 255 to the modulator 27. The modulator 27 receives the modulation control signal 255. Therefore, the modulator 27 modulates the communication laser beam 26A according to the modulation control signal 255. A modulator 27A emits the modulated communication laser beam 26A to the communication laser irradiation optical system 28. The communication laser irradiation optical system 28 receives the modulated communication laser beam 26A.

The control device 25 generates an irradiation direction control (IR-DIR CTRL) signal 256 to control the irradiation direction of the communication laser beam 26A. The control device 25 transmits the irradiation direction control signal 256 to the communication laser irradiation optical system 28. The communication laser irradiation optical system 28 receives the irradiation direction control signal 256. Therefore, the communication laser irradiation optical system 28 adjusts the irradiation direction of the communication laser beam 26A according to the irradiation direction control signal 256. Here, it is desirable that the irradiation direction of the communication laser irradiation optical system 28 is basically adjusted to the direction of the reception optical system 11A of the first communication station 10. The communication laser irradiation optical system 28 irradiates the communication laser beam 26A to the adjusted irradiation direction.

(Laser Beam Communication Method)

Figure 4:
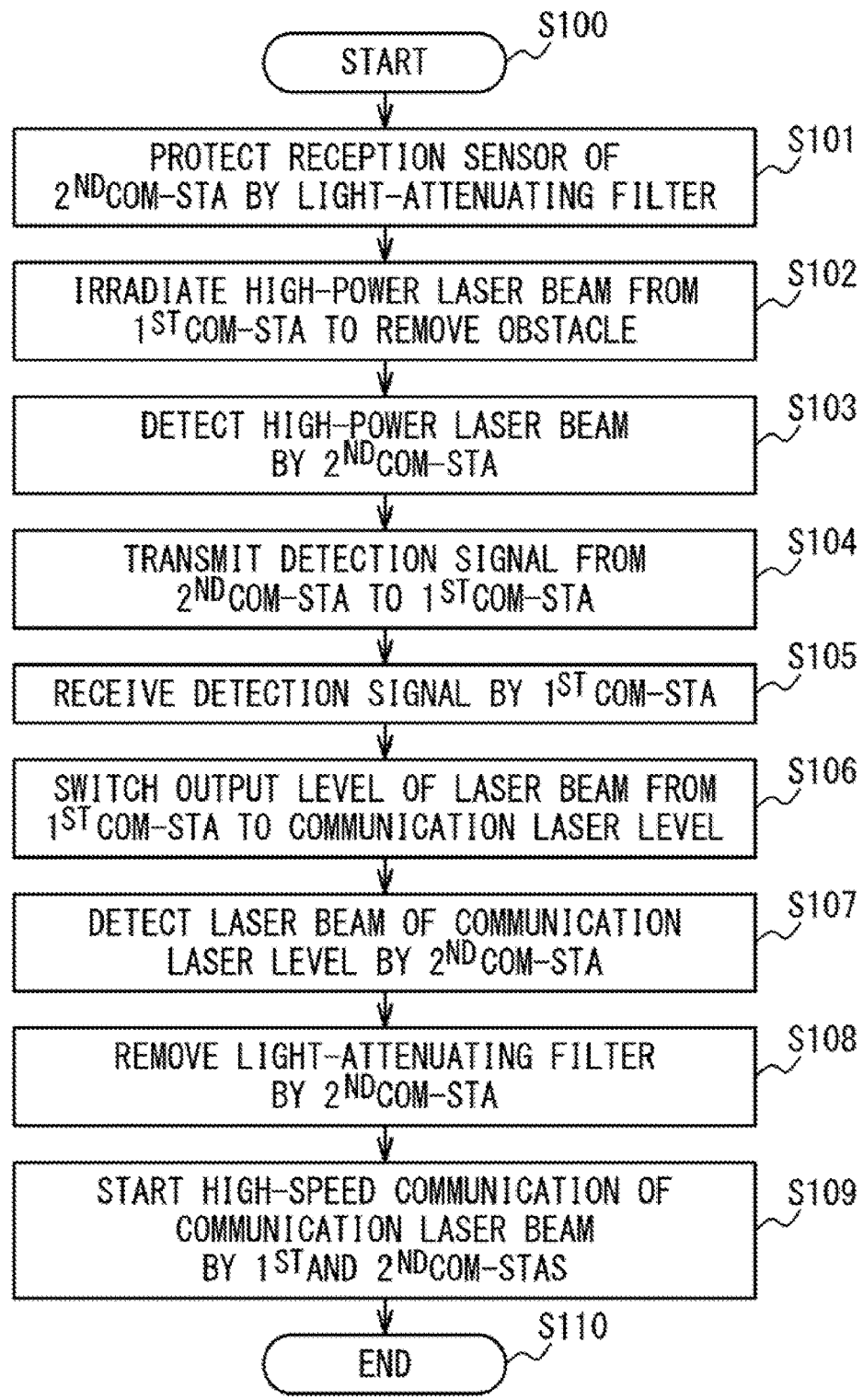
FIG. 4 is a flow chart showing a configuration example of a laser communication method according to the first embodiment.

Referring to FIG. 4, and FIG. 5A to FIG. 5D, the overall operation of the laser communication system 1 according to the first embodiment, i.e. a laser beam communication method will be described. FIG. 4 is a flow chart showing a configuration example of the laser beam communication method according to an embodiment. The flow chart of FIG. 4 contains 11 steps of a $0^{th}$ step S100 to a tenth step S110. The flow chart of FIG. 4 begins from the $0^{th}$ step S100. After the $0^{th}$ step S100, a first step S101 is executed.

Figure 5A:
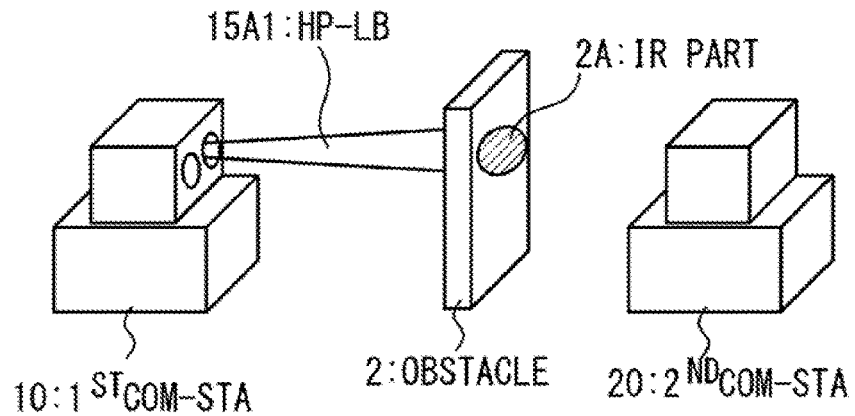
FIG. 5A is a diagram showing an example of state that the laser communication system according to the first embodiment removes the obstacle with the high-power laser beam.

FIG. 5A is a diagram showing an example of state that the laser communication system 1 according to the first embodiment removes the obstacle 2 with the high-power laser beam 15A1. In the example of FIG. 5A, the channel of the spatial laser communication between the first communication station 10 and the second communication station 20 is blocked by the obstacle 2 between the first communication station 10 and the second communication station 20. The first communication station 10 can detect the existence of the obstacle 2, when a period during which the communication laser beam 26A from the second communication station 20 does not reach or cannot be received exceeds a predetermined length. In the same way, the second communication station 20, too, can be detect the existence of the obstacle 2 when a period during which the communication laser beam 15B1 does not reach from the first communication station 10 exceeds a predetermined length. In this case, at the first step S101, the second communication station 20 protects the reception sensor 24 by the light-attenuating filter 23, before the first communication station 10 irradiates the high-power laser beam 15A1 to remove the obstacle 2. In other words, in order to prevent that the reception sensor 24 provided to receive the communication laser beam 15B1 of a relatively low output receives the irradiation of the high-power laser beam 15A1 to be destroyed, a control is carried out to drop the variable transmittance of the light-attenuating filter 23. After the first step S101, a second step S102 is executed.

At second step S102, the first communication station 10 irradiates the high-power laser beam 15A1 to remove the obstacle 2. At this time, a part of the obstacle 2 where the high-power laser beam 15A1 is irradiated is called an irradiated part 2A for convenience. It is desirable that the irradiated part 2A contains a space where the communication laser beams 15B1 and 26A are transmitted between the first communication station 10 and the second communication station 20. Here, a case where the irradiated part 2A in which the high-power laser beam 15A1 is irradiated fuses so that a hole 2B is formed is considered. After the second step S102, a third step S103 is executed.

At the third step S103, the second communication station 20 detects the high-power laser beam 15A1. Here, the high-power laser beam 15A1 passes through the hole 2B to reach the second communication station 20. The high-power laser beam 15A1 having reached the second communication station 20 is received by the reception sensor 24 of the second communication station 20 in the condition that the power of the high-power laser beam 15A1 drops sufficiently by passing through the light-attenuating filter 23. When detecting the incidence of the high-power laser beam 15A1, the reception sensor 24 generates and transmits the reception signal 241, which contains data showing the detection, to the control device 25. After the third step S103, a fourth step S104 is executed.

Figure 5B:
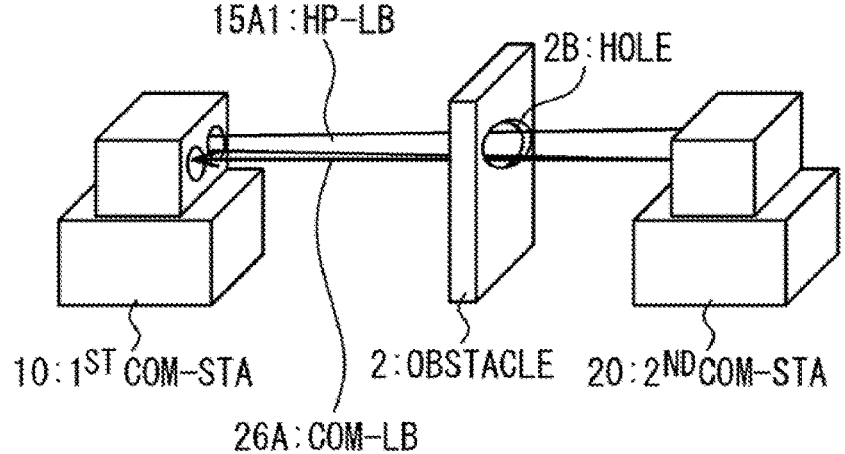
FIG. 5B is a diagram showing an example of state that a second communication station of the laser communication system according to the first embodiment detects the high-power laser beam to transmit a detection signal.

At the fourth step S104, the second communication station 20 transmits the detection signal to the first communication station 10. The detection signal is a signal to inform to the first communication station 10 that the second communication station 20 detected the high-power laser beam 15A1. In other words, the detection signal is a signal to inform to the first communication station 10 that the obstacle 2 has been removed to an extent that the spatial laser beam communication becomes possible between the first communication station 10 and the second communication station 20 at least. This detection signal is generated by the control device 25 of the second communication station 20 having received the reception signal 241. After that, the detection signal is transmitted to the first communication station 10 by the communication laser beam 26A generated by the communication laser oscillator 26, the modulator 27 and the communication laser irradiation optical system 28. FIG. 5B is a diagram showing an example of state that the second communication station of the laser communication system 1 according to the first embodiment detects the high-power laser beam to transmit the detection signal. After the fourth step S104, a fifth step S105 is executed.

At the fifth step S105, the first communication station 10 receives the detection signal. More specifically, at the fourth step S104, the first communication station 10 receives the detection signal by the communication laser beam 26A irradiated from the second communication station 20. In other words, this detection signal is received by the reception optical system 11A of the first communication station 10 as the communication laser beam 26A, and is converted into the reception signal 131 by the reception sensor 13 to be transmitted to the control device 14. After the fifth step S105, a sixth step S106 is executed.

Figure 5C:
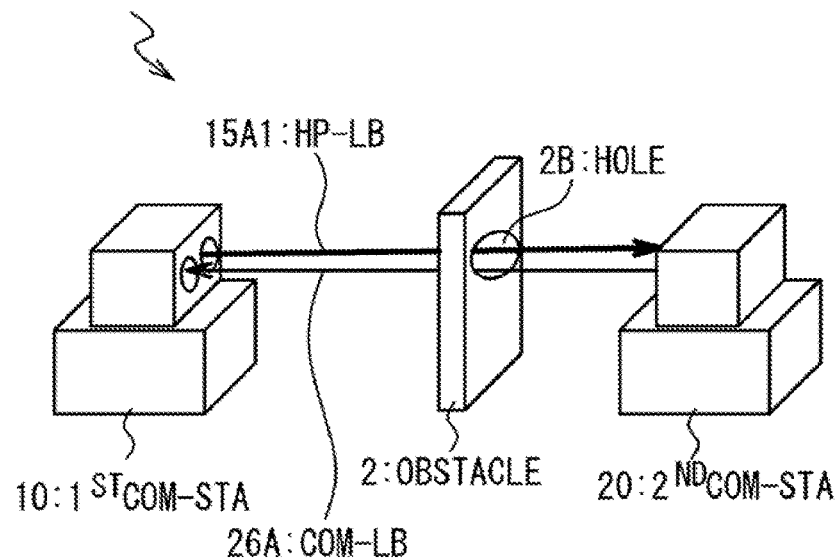
FIG. 5C is a diagram showing an example of state that a first communication station of the laser communication system according to the first embodiment changes the output level of the laser beam to be outputted to a communication level.

At the sixth step S106, the first communication station 10 changes the output level of the laser beam from the high-power level for removal of the obstacle 2 to the low output level for the communication. In the present embodiment, the irradiation of the high-power laser beam 15A1 is stopped and the irradiation of the communication laser beam 15B1 is started instead. The changing of the output level may be carried out by reducing the output level of the high-power laser beam 15A1 continuously or step-by-step. FIG. 5C is a diagram showing an example of state that the output level of the laser beam outputted from the first communication station 10 of the laser communication system 1 according to the first embodiment is changed to the power level for the communication. After the sixth step S106, a seventh step S107 is executed.

At the seventh step S107, the second communication station 20 detects the laser beam of an output level for the communication. The intensity of the laser beam irradiated to the second communication station 20 from the first communication station 10 may not always be equal to the output level for the communication. What is important is to confirm that the intensity of the laser beam is low to an extent not to destroy the reception sensor 24 of the second communication station 20 irradiated to the second communication station 20 even if the light-attenuating filter 23 is removed. This confirmation may be carried out by the control device 25 using the intensity of the laser beam received by the reception sensor 24 and the transmittance of the light-attenuating filter 23. After the seventh step S107, an eighth step S108 is executed.

At the eighth step S108, the second communication station 20 removes the light-attenuating filter 23. The light-attenuating filter 23 may be physically moved from the position between the reception optical system 21A and the reception sensor 24 to a different position. Or, the transmittance of the light-attenuating filter 23 may be raised to an extent that the reception sensitivity of the communication laser beam 15B1 of a comparatively low output level is sufficiently acquired, without moving the light-attenuating filter 23 from the position between the reception optical system 21A and the reception sensor 24. After the eighth step S108, a ninth step S109 is executed.

Figure 5D:
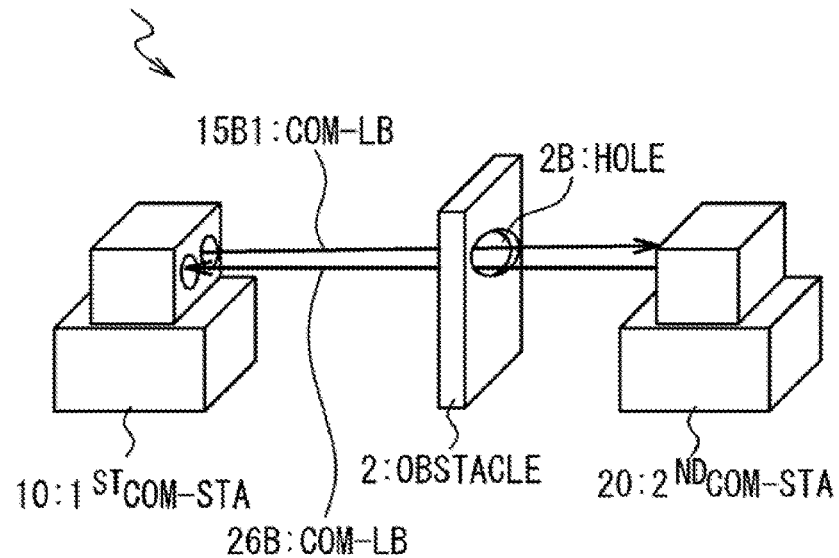
FIG. 5D is a diagram showing an example of state that the second communication station of the laser communication system according to the first embodiment detects the laser beam of the communication level and starts high-speed communication.

At the ninth step S109, the first communication station 10 and the second communication station 20 start the high-speed communication by using the communication laser beams 15B1 and 26A. FIG. 5D is a diagram showing an example of state that the second communication station of the laser communication system 1 according to the first embodiment detects the communication laser beam of the low output level to start the high-speed communication. After the ninth step S109, a tenth step S110 is executed, and the flow chart of FIG. 4 ends. When the obstruction of the communication due to the obstacle recurs during the high-speed communication, the flow chart of FIG. 4 may be started once again from the $0^{th}$ step S100.

As described above, in the laser communication system 1 and the laser communication method according to the present embodiment, the confirmation of securement of the transmission path between the communication stations is carried out by the following method:

(1) Until the transmission path is established, the reception sensor 24 is protected by the light-attenuating filter 23 (the first step S101).

(2) After the hole is formed to pass through the obstacle 2 (the second step S102), when the second communication station 20 receives the high-power laser beam 15A1 (the third step S103), the second communication station 20 transmits the detection signal to the first communication station 10 (the fourth step S104).

(3) When receiving the detection signal from the second communication station 20 (the fifth step S105), the first communication station 10 reduces the power of the laser beam to be outputted (the sixth step S106).

(4) When the intensity of the laser beam irradiated from the first communication station 10 is reduced to the output level for communication (the seventh step S107), the light-attenuating filter 23 of the second communication station 20 is removed (the eighth step S108) and the high-speed communication is started (the ninth step S109).

In this way, according to the laser communication system 1 and the laser communication method of the present embodiment, it is possible to exclude the obstacle 2 from the transmission path, which makes a spatial laser communication possible. This means that the communication having high confidentiality can be established in a short time without removing rubble physically in heavy equipment, underlying a communication cable among communication stations and carrying out the large-scale work, even if the rubble is produced under the disaster, so that the transmission path is covered by the rubble. Also, for example, in the communication between an artificial satellite and a ground station, even if a transmission path is covered by so-called space debris so that the physical removal is impossible, or the construction of a communication cable is impossible, the communication can be made possible by removing an obstacle.

Second Embodiment

Figure 6:
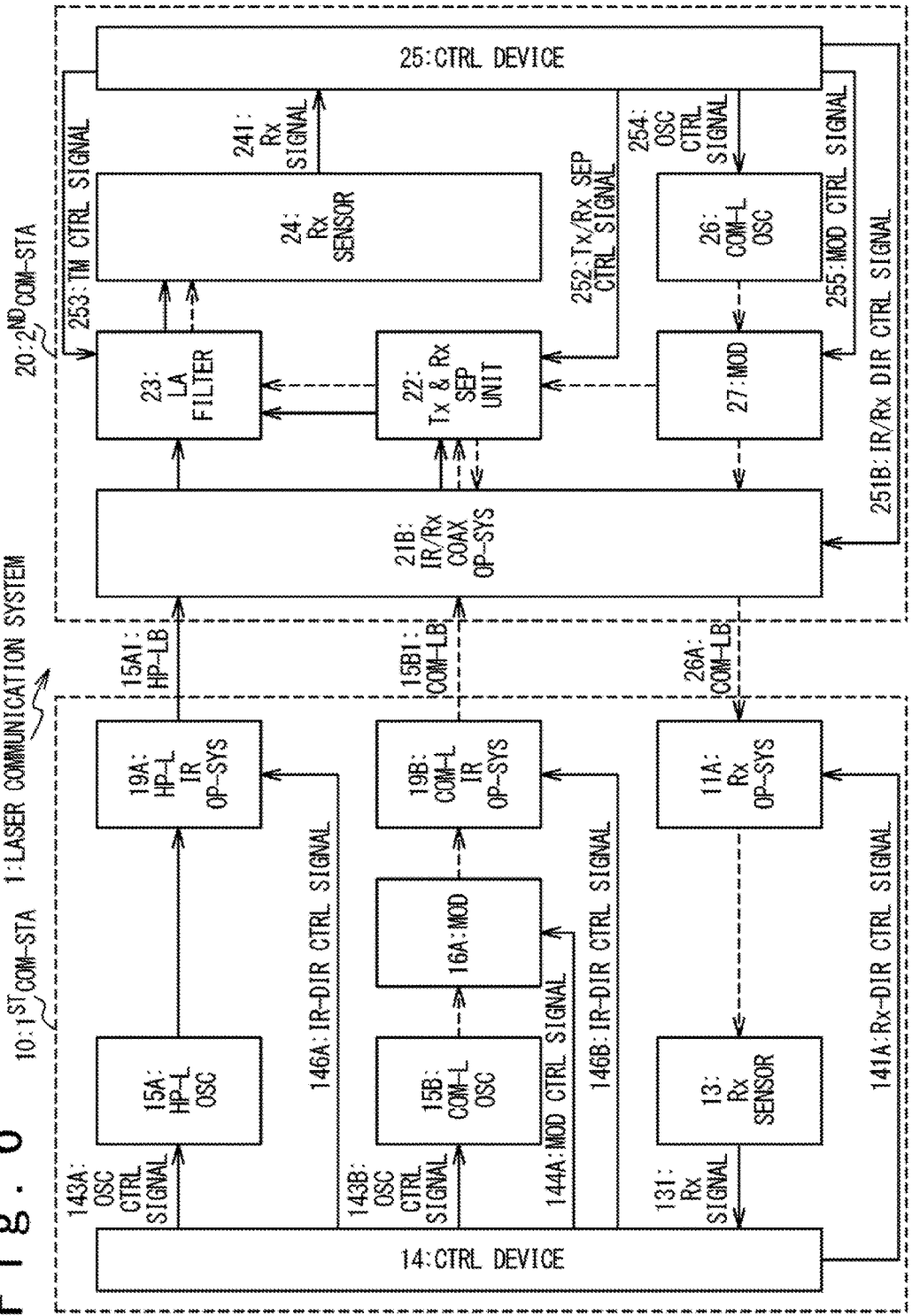
FIG. 6 is a block circuit diagram showing a configuration example of the laser communication system according to a second embodiment.

FIG. 6 is a block circuit diagram showing a configuration example of the laser communication system 1 according to a second embodiment. The laser communication system 1 according to the present embodiment shown in FIG. 6 has the following difference points, compared with the laser communication system 1 according to the first embodiment shown in FIG. 3. That is, in the present embodiment, the optical axes of the laser beams which are transmitted and received are coaxialized in the second communication station 20.

Specifically, the reception optical system 21A and the communication laser irradiation optical system 28 in the first embodiment are unified. The reception optical system 21A and the communication laser irradiation optical system 28 which have been unified corresponds to an irradiation/reception coaxial optical system (IR/Rx COAX OP-SYS) 21B in the present embodiment. In other words, in the second communication station 20, the communication laser beam 15B1 irradiated from the first communication station 10 and the communication laser beam 26A irradiated to the first communication station 10 are received and emitted by the irradiation/reception coaxial optical system 21B. As a result, in the present embodiment, the area of the hole 2B to be formed in the obstacle 2 is smaller than that of the first embodiment. This leads to the saving of energy which is necessary to remove the obstacle 2, and the reduction of time to secure a transmission path.

In the laser communication system 1 according to the present embodiment, a transmission and reception separating (Tx & Rx SEP) unit 22 is added, compared with the first embodiment. The transmission and reception separating unit 22 separates a laser beam irradiated from and a laser beam received by the irradiation/reception coaxial optical system 21B. For example, this separation can be realized by rotating a reflector having a hole. That is, when receiving a laser beam by the irradiation/reception coaxial optical system 21B, the laser beam is reflected to the light-attenuating filter 23 by the reflector. Oppositely, when irradiating the laser beam, the laser beam supplied from the modulator 27 is led to the irradiation/reception coaxial optical system 21B through the hole of the reflector.

The connection relation of the transmission and reception separating unit 22 will be described.

When paying attention to the optical connection relation, the transmission and reception separating unit 22 is connected with the irradiation/reception coaxial optical system 21B, the light-attenuating filter 23 and the modulator 27. In case of the laser beam irradiated to the second communication station 20 from the first communication station 10, the transmission and reception separating unit 22 is arranged in the subsequent stage of the irradiation/reception coaxial optical system 21B, and arranged in the front stage of the light-attenuating filter 23. In case of the laser beam irradiated to the first communication station 10 from the second communication station 20, the transmission and reception separating unit 22 is arranged in the subsequent stage of the modulator 27, and arranged in the front-stage of the irradiation/reception coaxial optical system 21B.

Also, when paying attention to the electrical connection relation, the transmission and reception separating unit 22 is connected with the control device 25.

The operation of components of the second communication station 20 according to the irradiation/reception coaxial optical system 21B and the transmission and reception separating unit 22 will be described.

The control device 25 generates an irradiation/reception direction control (IR/Rx DIR CTRL) signal 251B to control the irradiation direction and reception direction of the irradiation/reception coaxial optical system 21B. The control device 25 transmits the irradiation/reception direction control signal 251B to the irradiation/reception coaxial optical system 21B. The irradiation/reception coaxial optical system 21B receives the irradiation/reception direction control signal 251B. The irradiation/reception coaxial optical system 21B adjusts the irradiation direction/reception direction in response to the irradiation/reception direction control signal 251B. The irradiation/reception coaxial optical system 21B receives the laser beam from the adjusted reception direction and also irradiates the laser beam to the adjusted irradiation direction.

The control device 25 generates a transmission/reception separation control (Tx/Rx SEP CTRL) signal 252. The control device 25 transmits the transmission/reception separation control (Tx/Rx SEP CTRL) signal 252 to the transmission and reception separating unit 22. The transmission and reception separating unit 22 receives the transmission/reception separation control signal 252. Therefore, the transmission and reception separating unit 22 switches between two states according to the transmission/reception separation control signal 252. That is, in a first state, the laser beam received by the irradiation/reception coaxial optical system 21B is led to the light-attenuating filter 23. Also, in a second state, the laser beam supplied from the modulator 27 is led to the irradiation/reception coaxial optical system 21B.

The remaining configuration of the laser communication system 1 according to the present embodiment and each step of the laser communication method according to the present embodiment are same as in the first embodiment. Therefore, further detailed description is omitted.

The effect of the present embodiment will be described. As mentioned above, in the present embodiment, the area of the hole 2B to be formed in the obstacle 2 becomes smaller than in the first embodiment. This leads to the saving of energy which is necessary to remove the obstacle 2, and the reduction of time to secure a transmission path.

Third Embodiment

Figure 7:
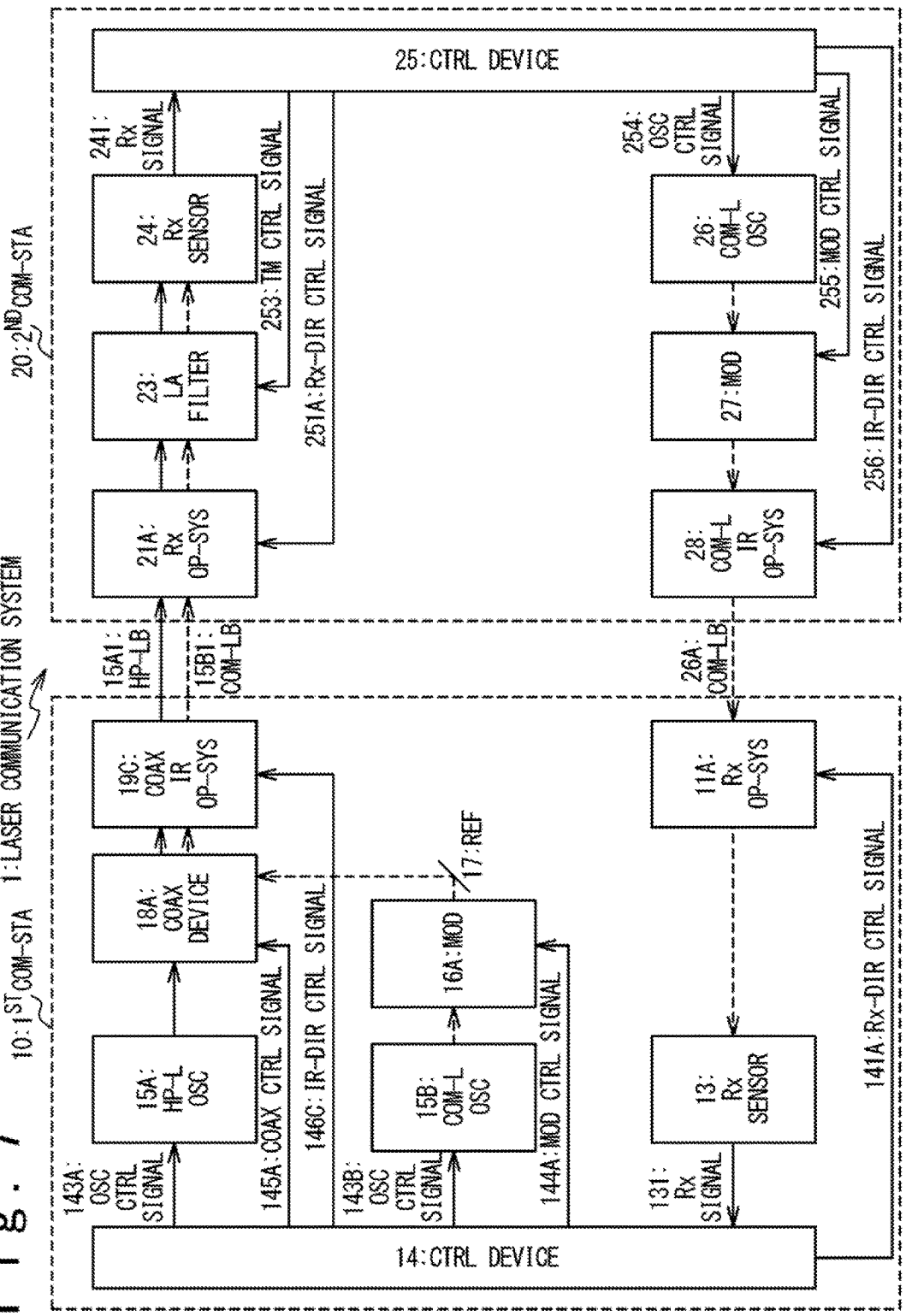
FIG. 7 is a block circuit diagram showing a configuration example of the laser communication system according to a third embodiment.

FIG. 7 is a block circuit diagram showing a configuration example of the laser communication system 1 according to a third embodiment. The laser communication system 1 according to the present embodiment shown in FIG. 7 has the following different points, compared with the laser communication system according to the first embodiment shown in FIG. 3. That is, in the present embodiment, the optical axis of the high-power laser beam 15A1 and that of the communication laser beam 15B1 are coaxialized in the first communication station 10.

Specifically, the high-power laser irradiation optical system 19A and the communication laser irradiation optical system 19B in the first embodiment are unified. The high-power laser irradiation optical system 19A and the communication laser irradiation optical system 19B which have been unified corresponds to the coaxial irradiation optical system (COAX IR OP-SYS) 19C in the third embodiment. In other words, both of the high-power laser beam 15A1 and the communication laser beam 15B1 which are irradiated from the first communication station 10 are emitted on a coaxial path from the coaxial irradiation optical system 19C. As a result, in the present embodiment, the area of the hole 2B to be formed in the obstacle 2 becomes smaller than in the first embodiment, like the second embodiment. This leads to the saving of energy which is necessary to remove the obstacle 2, and the reduction of time to secure a transmission path.

In the laser communication system 1 in the present embodiment, a coaxialization (COAX) device 18A and the reflector 17 as an auxiliary optical system are added, compared with the first embodiment. The reflector 17 leads the communication laser beam 15B1 emitted from the modulator 16A, to an input of the coaxialization device 18A. Note that the reflector 17 is an example and does not exclude an auxiliary optical system of another configuration. The coaxialization device 18A coaxializes the high-power laser beam 15A1 and the communication laser beam 15B1 which are supplied from different optical axes, and emits on the identical optical axis. For example, the coaxialization may be realized by using a half prism.

The connection relation of the coaxialization device 18A will be described.

When paying attention to the optical connection relation, the coaxialization device 18A is connected with the high-power laser oscillator 15A, the modulator 16A and the coaxial irradiation optical system 19C. In case of the high-power laser beam 15A1 emitted from the first communication station 10, the coaxialization device 18A is arranged in the subsequent stage of the high-power laser oscillator 15A and is arranged in the front stage of the coaxial irradiation optical system 19C. Also, in case of the communication laser beam 15B1 emitted from the first communication station 10, the coaxialization device 18A is arranged in the subsequent stage of the modulator 16A through the reflector 17 as the auxiliary optical system, and is arranged in the front stage of the coaxial irradiation optical system 19C.

Also, when paying attention to the electrical connection relation, the coaxialization device 18A is connected with the control device 14.

The connection relation of the coaxial irradiation optical system 19C will be described. When paying attention to the optical connection relation, the coaxial irradiation optical system 19C is arranged in the subsequent stage of the coaxialization device 18A. Also, when paying attention to the electrical connection relation, the coaxial irradiation optical system 19C is connected with the control device 14.

The operation of components of the first communication station 10 according to the coaxialization device 18A and the coaxial irradiation optical system 19C will be described.

The control device 14 generates a coaxialization control (COAX CTRL) signal 145A to control the coaxialization of the high-power laser beam 15A1 and the communication laser beam 15B1. The control device 14 transmits the coaxialization control signal 145A to the coaxialization device 18A. The coaxialization device 18A receives the coaxialization control signal 145A. The coaxialization device 18A adjusts the reception direction of the high-power laser beam 15A1, the reception direction of the communication laser beam 15B1, and the output direction of the high-power laser beam 15A1 and the communication laser beam 15B1 which are coaxialized, according to the coaxialization control signal 145A. The coaxialization device 18A receives the high-power laser beam 15A1 emitted from the high-power laser oscillator 15A, and emits to the coaxial irradiation optical system 19C. Also, the coaxialization device 18A receives the communication laser beam 15B1 emitted from the modulator 16A through the reflector 17 as the auxiliary optical system and emits to the coaxial irradiation optical system 19C.

The control device 14 generates an irradiation direction control (IR-DIR CTRL) signal 146C to control the irradiation directions of the high-power laser beam 15A1 and the communication laser beam 15B1. The control device 14 transmits the irradiation direction control signal 146C to the coaxial irradiation optical system 19C. The coaxial irradiation optical system 19C receives the irradiation direction control signal 146C. Therefore, the coaxial irradiation optical system 19C adjusts the irradiation direction of the high-power laser beam 15A1 and the communication laser beam 15B1 according to the irradiation direction control signal 146C, and the coaxial irradiation optical system 19C irradiates the laser beam received from the coaxialization device 18A to the adjusted irradiation direction.

The remaining configuration of the laser communication system 1 according to the present embodiment and each step of the laser communication method according to the present embodiment are same as in the first embodiment. Therefore, further detailed description is omitted.

The effect of the present embodiment will be described. As mentioned above, in the present embodiment, the area of the hole 2B to be formed in the obstacle 2 becomes smaller than the first embodiment. This leads to the saving of energy which is necessary to remove the obstacle 2, and the reduction of time to secure a transmission path.

Fourth Embodiment

Figure 8:
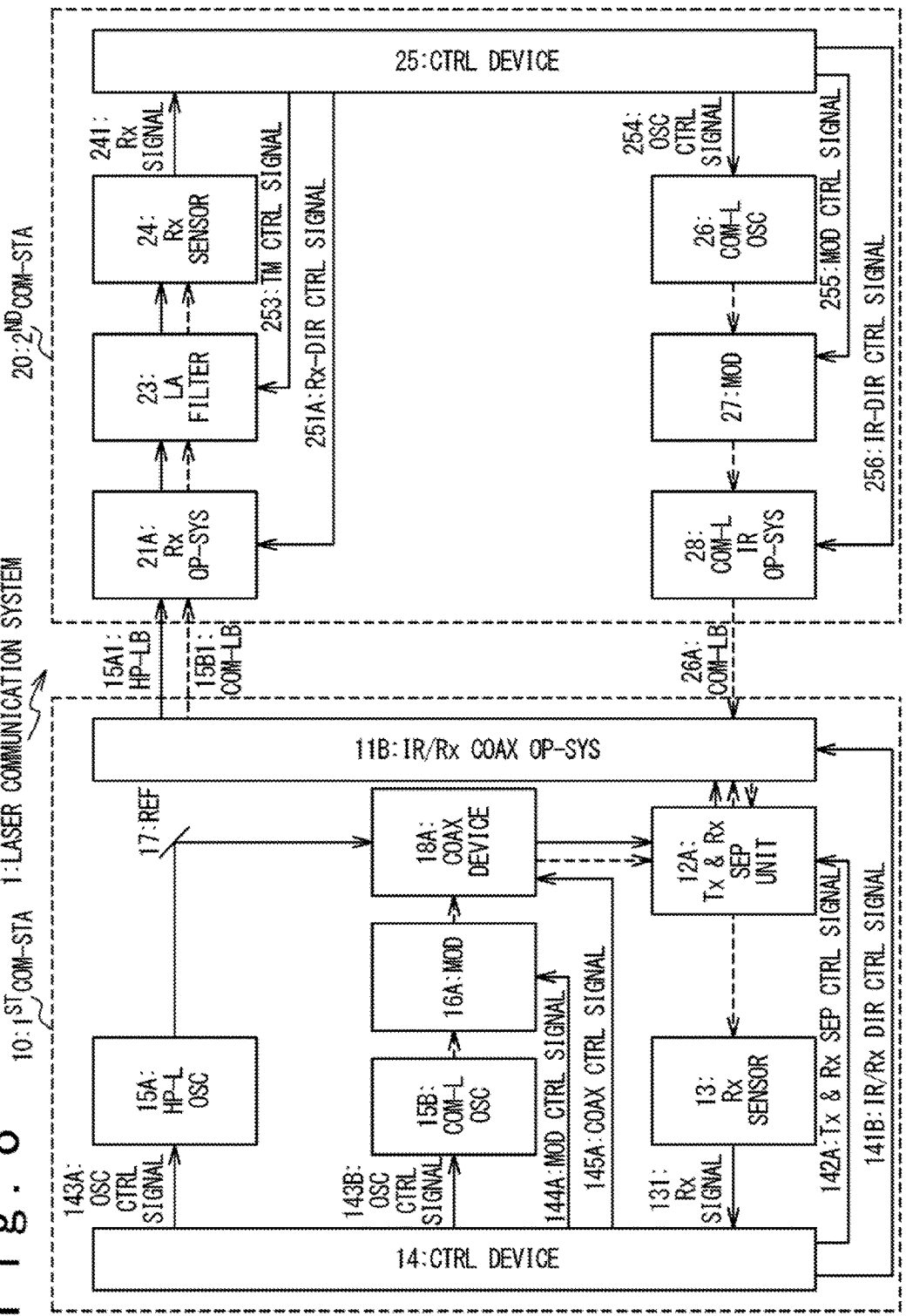
FIG. 8 is a block circuit diagram showing a configuration example of the laser communication system according to a fourth embodiment.

FIG. 8 is a block circuit diagram showing a configuration example of the laser communication system 1 according to a fourth embodiment. The laser communication system 1 according to the present embodiment shown in FIG. 8 has the following different points, compared with the laser communication system 1 according to the third embodiment shown in FIG. 7. That is, in the present embodiment, the optical axes of the laser beams transmitted and received by the first communication station 10 are coaxialized.

Specifically, the reception optical system 11A and the coaxial irradiation optical system 19C in the third embodiment are unified. The reception optical system 11A and the coaxial irradiation optical system 19C which have been unified correspond to an irradiation/reception coaxial optical system (IR/Rx COAX OP-SYS) 11B in the present embodiment. In other words, in the first communication station 10, the communication laser beam 26A irradiated from the second communication station 20 and the high-power laser beam 15A1 and the communication laser beam 15B1 which are irradiated from the first communication station 10 are received and irradiated by the irradiation/reception coaxial optical system 11B. As a result, in the present embodiment, the area of the hole 2B to be formed in the obstacle 2 becomes smaller than in the third embodiment. This leads to further saving of energy which is necessary to remove the obstacle 2, and further reduction of time to secure a transmission path.

In the laser communication system 1 according to the present embodiment, a transmission/reception separating unit 12A is added, compared with the third embodiment. The transmission/reception separating unit 12A separates laser beams irradiated from and received by the irradiation/reception coaxial optical system 11B. The configuration and operation principle of the irradiation/reception coaxial optical system 11B are same as in the irradiation/reception coaxial optical system 21B described in the second embodiment. Therefore, further detailed description is omitted.

Moreover, the reflector (REF) 17 and the coaxialization device 18A according to the present embodiment are different from the case of the third embodiment in the arrangement. That is, in the present embodiment, the coaxialization device 18A is arranged to directly receive the communication laser beam 15B1 emitted from the modulator 16A, and the reflector 17 as the auxiliary optical system is arranged to lead the high-power laser beam 15A1 emitted from the high-power laser oscillator 15A to the coaxialization device 18A. However, these differences in the arrangement do not bring an essential change to the effect when coaxializing the high-power laser beam 15A1 and the communication laser beam 15B1.

The connection relation of the transmission/reception separating unit 12A will be described.

When paying attention to the optical connection relation, the transmission/reception separating unit 12A is connected with the irradiation/reception coaxial optical system 11B, the reception sensor 13 and the coaxialization device 18A. In case of the laser beam irradiated to the first communication station 10 from the second communication station 20, the transmission/reception separating unit 12A is arranged in the subsequent stage of the irradiation/reception coaxial optical system 11B, and is arranged in the front-stage of the reception sensor 13. In case of the laser beam irradiated to the second communication station 20 from the first communication station 10, the transmission/reception separating unit 12A is arranged in the subsequent stage of the coaxialization device 18A, and is arranged in the front stage of the irradiation/reception coaxial optical system 11B.

Also, when paying attention to the electrical connection relation, the transmission/reception separating unit 12A is connected with the control device 25.

The operation of components of the first communication station 10 according to the irradiation/reception coaxial optical system 11B and the transmission/reception separating unit 12A will be described.

The control device 14 generates an irradiation/reception direction control (IR/Rx DIR CTRL) signal 141B to control the irradiation direction and reception direction of the irradiation/reception coaxial optical system 11B. The control device 14 transmits the irradiation/reception direction control signal 141B to the irradiation/reception coaxial optical system 11B. The irradiation/reception coaxial optical system 11B receives the irradiation/reception direction control signal 141B. The irradiation/reception coaxial optical system 11B adjusts the irradiation direction/reception direction according to the irradiation/reception direction control signal 141B. The irradiation/reception coaxial optical system 11B receives a laser beam from the adjusted reception direction and also irradiates a laser beam to the adjusted irradiation direction.

The control device 14 generates a transmission/reception separation control (Tx/Rx SEP CTRL) signal 142A. The control device 14 transmits the transmission/reception separation control signal 142A to the transmission/reception separating unit 12A. The transmission/reception separating unit 12A receives the transmission/reception separation control signal 142A. Therefore, the transmission/reception separating unit 12A switches between two states according to the transmission/reception separation control signal 142A. That is, in a first state, the irradiation/reception coaxial optical system 12A leads the received laser beam to the reception sensor 13. Also, in a second state, the irradiation/reception coaxial optical system 12A leads the laser beam received from the coaxialization device 18A to the irradiation/reception coaxial optical system 11B.

The remaining configuration of the laser communication system 1 according to the present embodiment and each step of the laser communication method according to the present embodiment are same as in the third embodiment. Therefore, further detailed description is omitted.

The effect of the present embodiment will be described. As mentioned above, in the present embodiment, the area of the hole 2B to be formed in the obstacle 2 becomes smaller than the first embodiment. This leads to further saving of energy which is necessary to remove the obstacle 2, and further reduction of time to secure a transmission path.

Fifth Embodiment

Figure 9:
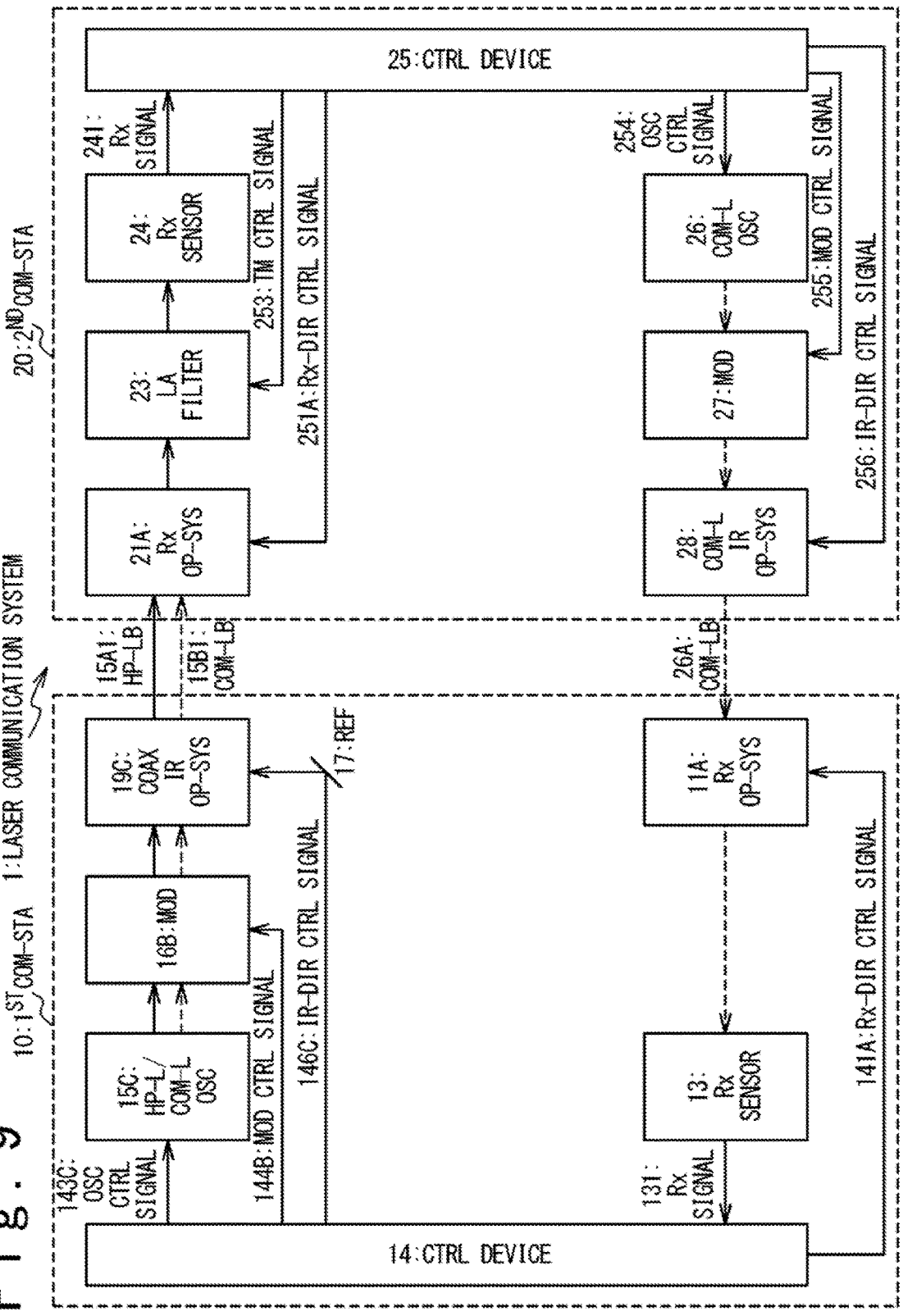
FIG. 9 is a block circuit diagram showing a configuration example of the laser communication system according to a fifth embodiment.

FIG. 9 is a block circuit diagram showing a configuration example of the laser communication system 1 according to a fifth embodiment. The laser communication system 1 according to the present embodiment shown in FIG. 9 has the following different points, compared with the laser communication system 1 according to the first embodiment shown in FIG. 3. That is, in the present embodiment, in the first communication station 10, the high-power laser beam 15A1 and the communication laser beam 15B1 are generated by a common laser oscillator.

Specifically, the high-power laser oscillator 15A and the communication laser oscillator 15B in the first embodiment are unified. The high-power laser oscillator 15A and the communication laser oscillator 15B which have been unified correspond to a high-power/communication laser oscillator 15C in the present embodiment. In other words, both of the high-power laser beam 15A1 and the communication laser beam 15B1 which are irradiated from the first communication station 10 are generated by the high-power/communication laser oscillator 15C, and are emitted on an optical co-axis. As a result, in the present embodiment, the area of the hole 2B to be formed in the obstacle 2 becomes smaller than the first embodiment, like the second to fourth embodiments. This leads to the saving of energy which is necessary to remove the obstacle 2, and the reduction of time to secure a transmission path.

The laser communication system 1 in the present embodiment has a modulator 16B in place of the modulator 16A in the first embodiment. The modulator 16B according to the present embodiment operates like the modulator 16A in the first embodiment regarding the operation to modulate the communication laser beam 15B1. However, the modulator 16B according to the present embodiment has a feature not to be destroyed even when the high-power laser beam 15A1 is supplied. For example, this feature may be realized by the configuration to be switched to a different internal optical system to endure the intensity when the high-power laser beam 15A1 is supplied. The switching of such a state may be controlled by the control device 14.

Also, the laser communication system 1 according to the present embodiment has the coaxial irradiation optical system 19C in place of the high-power laser irradiation optical system 19A and the communication laser irradiation optical system 19B in the first embodiment. The coaxial irradiation optical system 19C according to the present embodiment is the same as the coaxial irradiation optical system 19C according to the third embodiment shown in FIG. 7. Therefore, further detailed description is omitted.

The connection relation of the high-power/communication laser oscillator 15C will be described. When paying attention to the optical connection relation, the high-power/communication laser oscillator 15C is arranged in the front stage of the modulator 16B. Also, when paying attention to the electrical connection relation, the high-power/communication laser oscillator 15C is connected with the control device 14.

The connection relation of the modulator 16B will be described. When paying attention to the optical connection relation, the modulator 16B is arranged in the subsequent stage of the high-power/communication laser oscillator 15C, and is arranged in the front stage of the coaxial irradiation optical system 19C. Also, when paying attention to the electrical connection relation, the modulator 16B is connected with the control device 14.

The connection relation with the coaxial irradiation optical system 19C will be described. When paying attention to the optical connection relation, the coaxial irradiation optical system 19C is arranged in the subsequent stage of the modulator 16B. Also, when paying attention to the electrical connection relation, the coaxial irradiation optical system 19C is connected with the control device 14.

The operation of components in the first communication station 10 according to the high-power/communication laser oscillator 15C will be described.

The control device 14 generates an oscillation control (OSC CTRL) signal 143C to control the oscillation of the high-power laser beam 15A1 or the communication laser beam 15B1. The control device 14 transmits the oscillation control signal 143C to the high-power/communication laser oscillator 15C. The high-power/communication laser oscillator 15C receives the oscillation control signal 143C. The high-power/communication laser oscillator 15C oscillates and emits the high-power laser beam 15A1 or the communication laser beam 15B1 to the modulator (MOD) 16B in response to the oscillation control signal 143C. The modulator 16B receives the emitted high-power laser beam 15A1 or communication laser beam 15B1.

The control device 14 generates a modulation control (MOD CTRL) signal 144B to control the modulation of the communication laser beam 15B1. Transmission data is contained in the modulation control signal 144B, like the modulation control signal 144A in the first embodiment. In the case that high-power/communication laser oscillator (HP-L/COM-L OSC) 15C emits the high-power laser beam 15A1, an instruction to carry out the above-mentioned state switching by the modulator 16B may be contained in the modulation control signal 144B.

The operation of the coaxial irradiation optical system 19C according to the present embodiment is same as in the third embodiment. Therefore, further detailed description is omitted.

The remaining configuration of the laser communication system 1 according to the present embodiment and each step of the laser communication method according to the present embodiment are same as in the first embodiment. Therefore, further detailed description is omitted.

The effect of the present embodiment will be described. As mentioned above, in the present embodiment, the area of the hole 2B to be formed in the obstacle 2 becomes smaller than the first embodiment. This leads to the saving of energy which is necessary to remove the obstacle 2 and the reduction of time to secure a transmission path.

Sixth Embodiment

Figure 10:
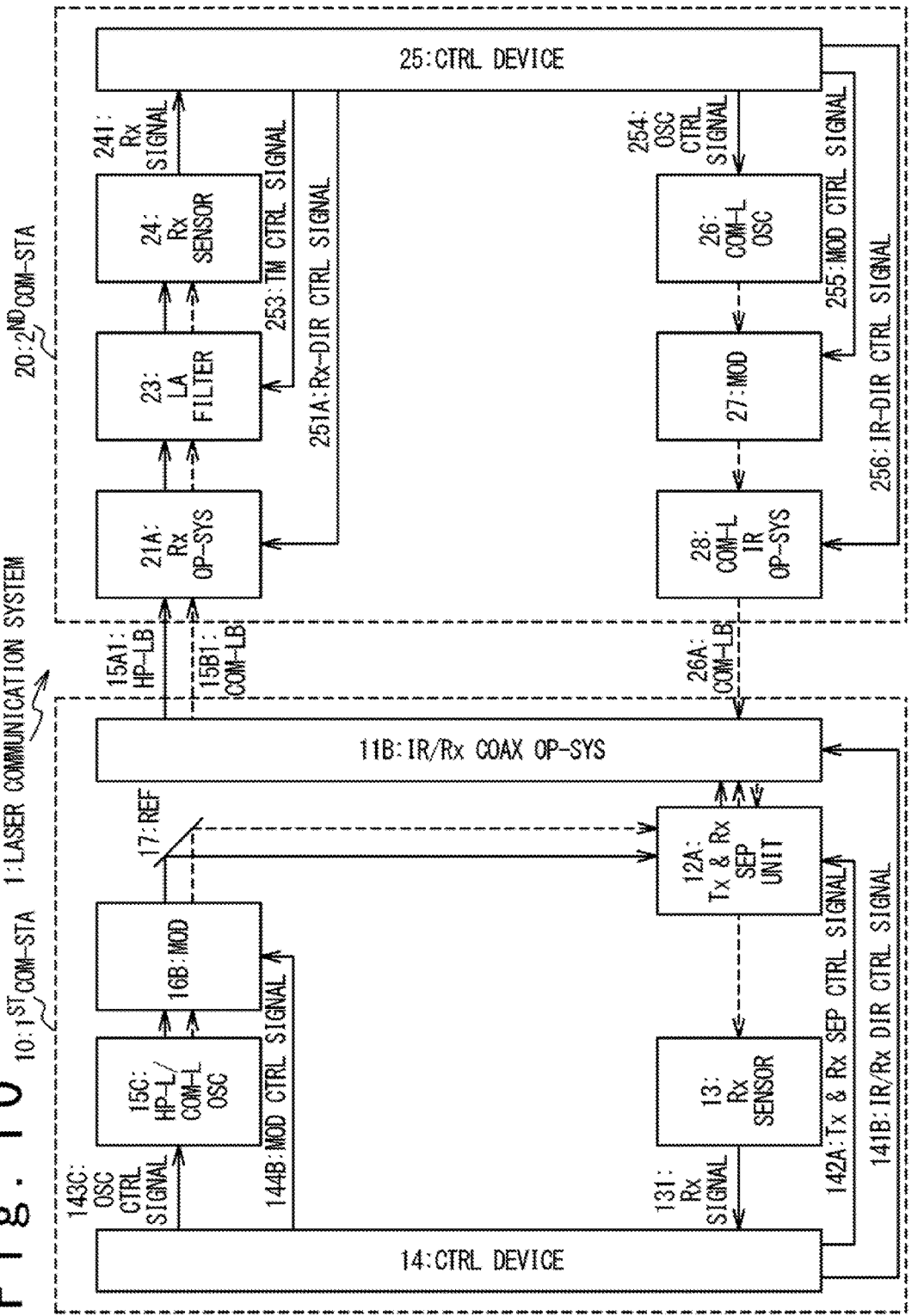
FIG. 10 is a block circuit diagram showing a configuration example of the laser communication system according to a sixth embodiment.

FIG. 10 is a block circuit diagram showing a configuration example of the laser communication system 1 according to a sixth embodiment. The laser communication system 1 according to the present embodiment shown in FIG. 7 has the following different points, compared with the laser communication system 1 according to the fifth embodiment shown in FIG. 9. That is, in the present embodiment, the optical axes of the laser beams transmitted and received by the first communication station 10 are coaxialized.

Viewing from another point, the laser communication system 1 according to the present embodiment shown in FIG. 7 has the following different points, compared with the laser communication system 1 according to the fourth embodiment shown in FIG. 8. That is, in the present embodiment, the high-power laser beam 15A1 and the communication laser beam 15B1 are generated by the common laser oscillator in the first communication station 10.

In other words, the laser communication system 1 according to the present embodiment is achieved by combining the fourth embodiment shown in FIG. 8 and the fifth embodiment shown in FIG. 9.

The different points of the present embodiment from the fifth embodiment shown in FIG. 9 will be described. In the present embodiment, the reception optical system 11A and the coaxial irradiation optical system 19C in the fifth embodiment are unified. The reception optical system 11A and the coaxial irradiation optical system 19C which have been unified correspond to the irradiation/reception coaxial optical system 11B in the present embodiment. The irradiation/reception coaxial optical system 11B in the present embodiment is the same as the irradiation/reception coaxial optical system 11B in the fourth embodiment shown in FIG. 8 in configuration and operation. Therefore, further detailed description is omitted. As a result, in the present embodiment, the area of the hole 2B to be formed in the obstacle 2 becomes smaller than the first embodiment. This leads to further saving of energy which is necessary to remove the obstacle 2 and further reduction of time to secure a transmission path.

Also, in the laser communication system 1 according to the present embodiment, the transmission/reception separating unit 12A is added, like the case of the fourth embodiment. The transmission/reception separating unit 12A according to the present embodiment is the same as the transmission/reception separating unit 12A in the fourth embodiment shown in FIG. 8 in configuration and operation. Therefore, further detailed description is omitted.

The remaining configuration of the laser communication system 1 according to the present embodiment and each step of the laser communication method according to the present embodiment are same as in the fifth embodiment. Therefore, further detailed description is omitted.

The effect of the present embodiment will be described. As mentioned above, in the present embodiment, the area of the hole 2B to be formed in the obstacle 2 becomes smaller than in the first embodiment. This leads to further saving of energy which is necessary to remove the obstacle 2 and further reduction of time to secure a transmission path.

Seventh Embodiment

Figure 11:
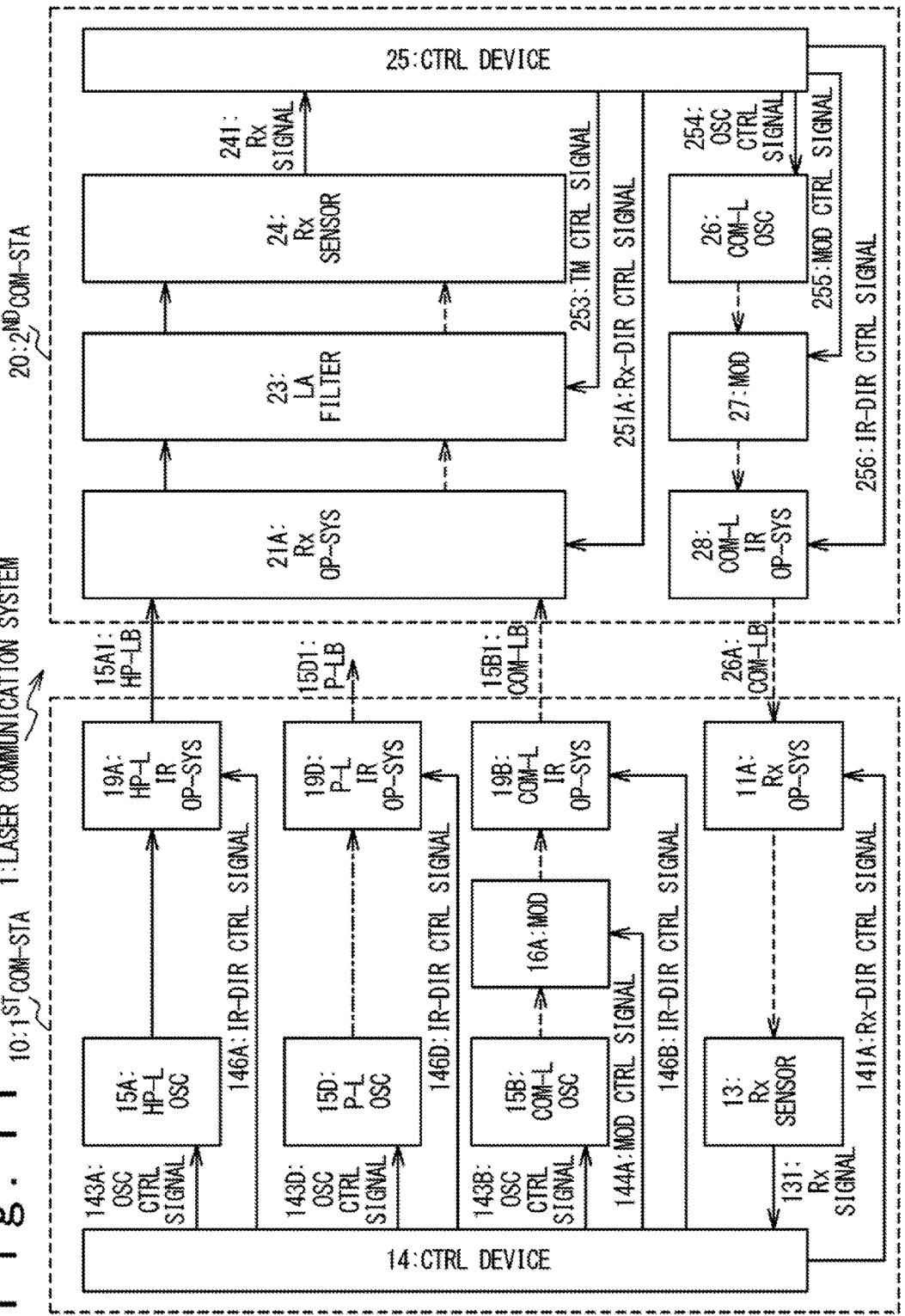
FIG. 11 is a block circuit diagram showing a configuration example of the laser communication system according to a seventh embodiment.

FIG. 11 is a block circuit diagram showing a configuration example of the laser communication system 1 according to a seventh embodiment. The laser communication system 1 according to the present embodiment shown in FIG. 11 has the following different points, compared with the laser communication system 1 according to the first embodiment shown in FIG. 3. That is, in the present embodiment, the first communication station 10 further irradiates a pulse laser beam 15D1.

Specifically, a pulse laser oscillator (P-L OSC) 15D and a pulse laser irradiation optical system (P-L IR OP-SYS) 19D are added to the first communication station 10 of the first embodiment. The pulse laser oscillator 15D can oscillate the pulse laser beam (P-LB) 15D1 having a very high output. The pulse laser irradiation optical system 19D irradiates the oscillated pulse laser beam 15D1 to the obstacle 3 of water droplets existing in the direction of the second communication station 20.

The pulse laser can have a very high output momentarily. Therefore, the pulse laser is suitable for removal of the obstacle 3 of water droplets. However, the pulse laser beam 15D1 irradiated from the first communication station 10 does not always reach the reception optical system 21A of the second communication station 20, unlike the continuous-wave high-power laser beam 15A1 and the communication laser beam 15B1.

The connection relation of the pulse laser oscillator 15D and the pulse laser irradiation optical system 19D will be described. When paying attention to the optical connection relation, the pulse laser irradiation optical system 19D is arranged in the subsequent stage of the pulse laser oscillator 15D. When paying attention to the electrical connection relation, the pulse laser oscillator 15D and the pulse laser irradiation optical system 19D are connected with the control device 14.

The operation of components of the first communication station 10 according to the pulse laser oscillator 15D and the pulse laser irradiation optical system 19D will be described.

The control device 14 generates an oscillation control (OSC CTRL) signal 143D to control the oscillation of pulse laser beam 15D1. The control device 14 transmits the oscillation control signal 143D to the pulse laser oscillator 15D. The pulse laser oscillator 15D receives the oscillation control signal 143D. Therefore, in response to the oscillation control signal 143D, the pulse laser oscillator 15D oscillates the pulse laser beam 15D1 to emit to the pulse laser irradiation optical system 19D. The pulse laser irradiation optical system 19D receives the pulse laser beam 15D1.

The control device 14 generates an irradiation direction control signal 146D to control the irradiation direction of the pulse laser beam 15D1. The control device 14 transmits the irradiation direction control signal 146D to the pulse laser irradiation optical system 19D. The pulse laser irradiation optical system 19D receives the irradiation direction control signal 146D. Therefore, the pulse laser irradiation optical system 19D adjusts the irradiation direction of the pulse laser beam 15D1 according to the irradiation direction control signal 146D. The pulse laser irradiation optical system 19D irradiates the pulse laser beam 15D1 to the adjusted irradiation direction.

The remaining configuration of the laser communication system 1 according to the present embodiment and each step of the laser communication method according to the present embodiment are same as in the first embodiment. Therefore, further detailed description is omitted.

The effect of the present embodiment will be described. As mentioned above, in the present embodiment, the pulse laser beam 15D1 suitable for removal of the obstacle 3 of water droplets can be irradiated, in addition to the high-power laser beam 15A1 suitable for removal of the obstacle 2. The removal of the obstacle 3 of water droplets is possible even by the continuous-wave high-power laser beam 15A1. The pulse laser beam 15D1 irradiated momentarily has higher applicability. Therefore, the laser communication system 1 according to the present embodiment suits the removal of the obstacle 3 of water droplets in addition to the solid obstacle 2.

Eighth Embodiment

Figure 12:
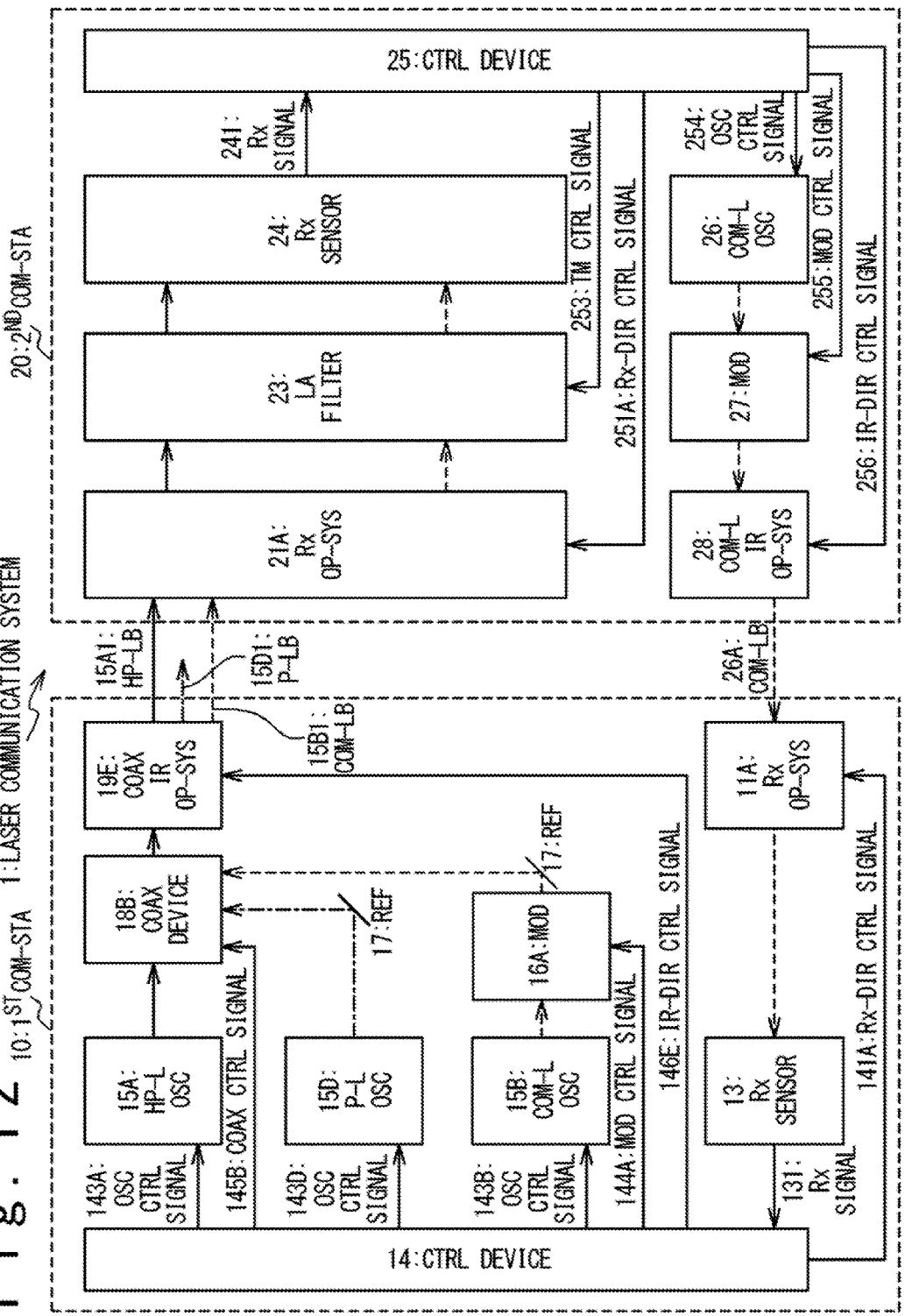
FIG. 12 is a block circuit diagram showing a configuration example of the laser communication system according to an eighth embodiment.

FIG. 12 is a block circuit diagram showing a configuration example of the laser communication system 1 according to an eighth embodiment. The laser communication system 1 according to the present embodiment shown in FIG. 12 has the following different points, compared with the laser communication system 1 according to the fifth embodiment shown in FIG. 7. That is, in the present embodiment, the first communication station 10 further irradiates the pulse laser beam 15D1.

Specifically, the pulse laser oscillator 15D and the reflector 17 as the auxiliary optical system are added to the laser communication system 1 of the fifth embodiment shown in FIG. 7. Also, the coaxialization device 18A and the coaxial irradiation optical system 19C in the fifth embodiment are replaced with a coaxialization (COAX) device 18B and a coaxial irradiation optical system (COAX IR OP-SYS) 19E, respectively. The effect of irradiation of the pulse laser beam 15D1 is same as in the seventh embodiment shown in FIG. 11. Therefore, further detailed description is omitted.

The connection relation of the pulse laser oscillator 15D, the reflector 17 and the coaxial irradiation optical system 19E will be described. When paying attention to the optical connection relation, the pulse laser oscillator 15D is connected with the front-stage of the coaxialization device 18B through the reflector 17. The coaxial irradiation optical system 19E is connected with the subsequent stage of the coaxialization device 18B. Also, when paying attention to the electrical connection relation, the pulse laser oscillator 15D and the coaxial irradiation optical system 19E are connected with the control device 14.

The operation of components of the first communication station 10 according to the pulse laser oscillator 15D and the coaxial irradiation optical system 19E will be described.

The control device 14 generates an oscillation control signal 143D to control the oscillation of pulse laser beam 15D1. The control device 14 transmits the oscillation control signal 143D to the pulse laser oscillator 15D. The pulse laser oscillator 15D receives the oscillation control signal 143D. The pulse laser oscillator 15D oscillates the pulse laser beam 15D1 according to the oscillation control signal 143D, to emit to the coaxialization device 18B through the reflector 17 as the auxiliary optical system. The coaxialization device 18B receives the pulse laser beam 15D1 through the reflector 17.

The control device 14 generates a coaxialization control (COAX CTRL) signal 145B to control the coaxialization of the high-power laser beam 15A1, the pulse laser beam 15D1 and the communication laser beam 15B1. The control device 14 transmits the coaxialization control signal 145B to the coaxialization device 18B. The coaxialization device 18B receives the coaxialization control signal 145B. The coaxialization device 18B adjusts the reception direction of the high-power laser beam 15A1, the reception direction of the pulse laser beam 15D1, the reception direction of the communication laser beam 15B1, and the irradiation direction of these received laser beams to the coaxial irradiation optical system 19E on an optical co-axis, according to the coaxialization control signal 145B. The coaxialization device 18B receives the high-power laser beam 15A1, the pulse laser beam 15D1, and the communication laser beam 15B1 from the adjusted reception direction. The coaxialization device 18B emits each of the high-power laser beams 15A1, the pulse laser beams 15D1 and the communication laser beam 15B1 to the adjusted coaxial emission direction. The coaxial irradiation optical system 19E receives the high-power laser beam 15A1, the pulse laser beam 15D1 and the communication laser beam 15B1.

The control device 14 generates an irradiation direction control (IR-DIR CTRL) signal 146E to control the irradiation directions of the high-power laser beam 15A1, the pulse laser beam 15D1 and the communication laser beam 15B1. The control device 14 transmits the irradiation direction control signal 146E to the coaxial irradiation optical system 19E. The coaxial irradiation optical system 19E receives the irradiation direction control signal 146E. The coaxial irradiation optical system 19E adjusts the irradiation directions of the high-power laser beam 15A1, the pulse laser beam 15D1 and the communication laser beam 15B1 according to the irradiation direction control signal 146E. The coaxial irradiation optical system 19E irradiates the laser beam received from the coaxialization device 18B to the adjusted irradiation direction.

The remaining configuration of the laser communication system 1 according to the present embodiment and each step of the laser communication method according to the present embodiment are same as in the fifth embodiment. Therefore, further detailed description is omitted.

The effect of the present embodiment will be described. Like the case of the fifth embodiment, the area of the hole 2B to be formed in the obstacle 2 becomes smaller in the present embodiment than in the first embodiment. This leads to the saving of energy which is required to remove the obstacle 2 and the reduction of time to secure a transmission path. Next, like the case of the seventh embodiment, the pulse laser beam 15D1 suitable for the removal of the obstacle 3 of water droplets can be irradiated in addition to the high-power laser beam 15A1 suitable for the removal of the obstacle 2 in the present embodiment.

The following variation is thought of in the present embodiment. That is, in this variation, only the high-power laser beam 15A1 and the pulse laser beam 15D are coaxialized and are irradiated from the coaxial irradiation optical system 19E. The communication laser beam 15B1 is not coaxialized and is irradiated from another irradiation optical system. In such a case, there is no change in the effect that the obstacle 3 of water droplets can be removed with the pulse laser beam 15D1. Also, the effect can be obtained that the area of the hole 2B to be formed in the obstacle 2 becomes smaller than in the seventh embodiment.

Ninth Embodiment

Figure 13:
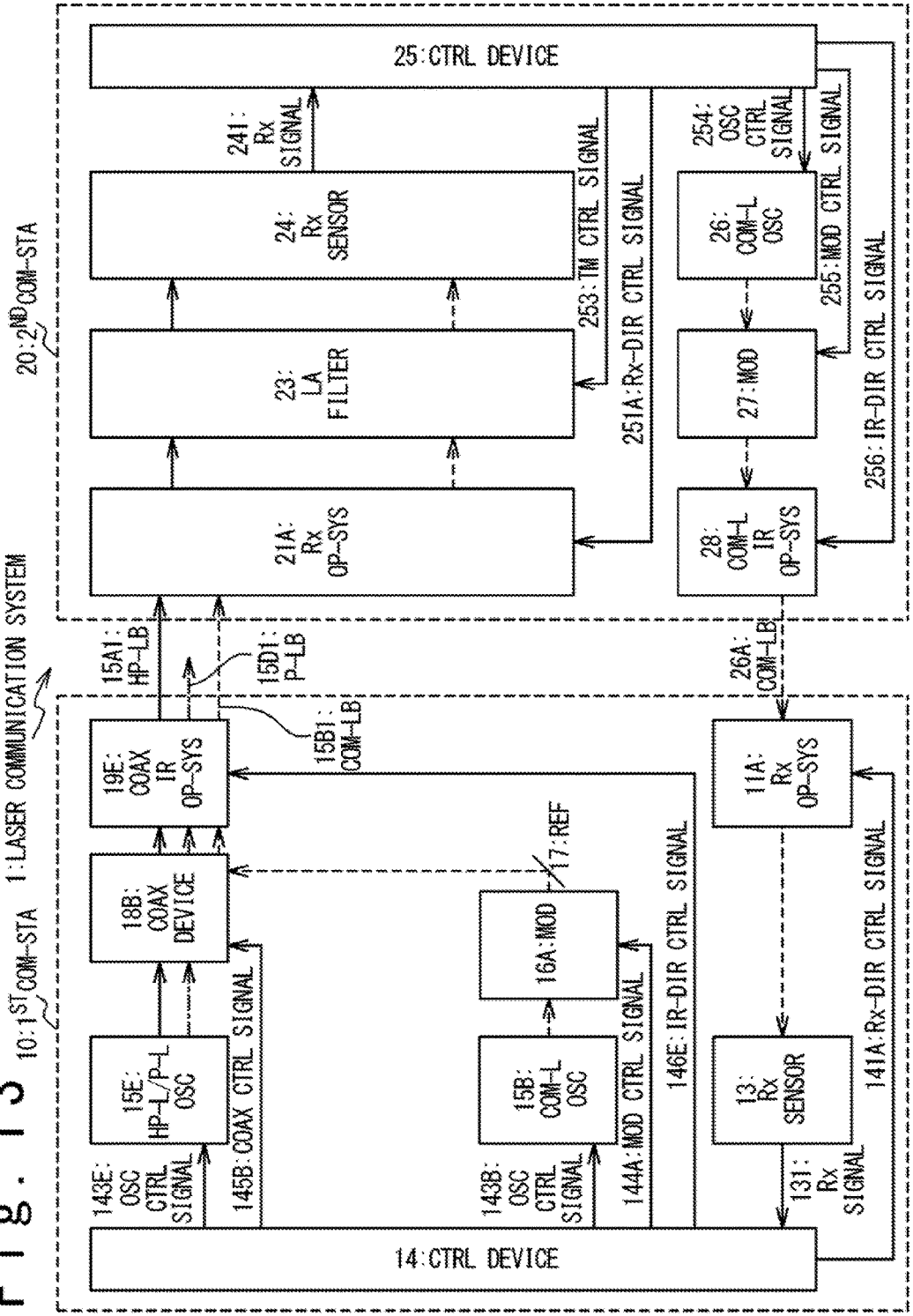
FIG. 13 is a block circuit diagram showing a configuration example of the laser communication system according to a ninth embodiment.

FIG. 13 is a block circuit diagram showing a configuration example of the laser communication system 1 according to a ninth embodiment. The laser communication system 1 according to the present embodiment shown in FIG. 9 has the following different points, compared with the laser communication system 1 according to the eighth embodiment shown in FIG. 12. That is, in the present embodiment, the high-power laser beam 15A1 and the pulse laser beam 15D1 are generated by the common laser oscillator in the first communication station 10.

Specifically, the high-power laser oscillator 15A and the pulse laser oscillator 15D in the eighth embodiment are unified. The high-power laser oscillator 15A and the pulse laser oscillator 15D having been unified correspond to a high-power/pulse laser oscillator (HP-L/P-L OSC) 15E in the present embodiment. In other words, both of the high-power laser beam 15A1 and the pulse laser beam 15D1 which are irradiated from the first communication station 10 are generated by the high-power/pulse laser oscillator 15E and emitted on the optical coaxial path. Moreover, the communication laser beam 15B1 is coaxialized by the coaxialization device 18B with the high-power laser beam 15A1 and the pulse laser beam 15D1. As a result, in the present embodiment, like the case of the eighth embodiment shown in FIG. 12, the area of the hole 2B to be formed in the obstacle 2 becomes smaller than in the seventh embodiment shown in FIG. 11. This leads to the saving of energy which is necessary to remove the obstacle 2 and the reduction of time to secure a transmission path. Moreover, because the number of laser oscillators decreases, the configuration of the laser communication system 1 can be simplified.

The connection relation of high-power/pulse laser oscillator 15E will be described. The high-power/pulse laser oscillator 15E is connected optically with the front stage of the coaxialization device 18B and electrically with the control device 14.

The operation of components of the first communication station 10 according to the high-power/pulse laser oscillator 15E will be described.

The control device 14 generates an oscillation control (OSC CTRL) signal 143E to control the oscillation of the high-power laser beam 15A1 or the pulse laser beam 15D1. The control device 14 transmits the oscillation control signal 143E to the high-power/pulse laser oscillator 15E. The high-power/pulse laser oscillator 15E receives the oscillation control signal 143E. The high-power/pulse laser oscillator 15E oscillates the high-power laser beam 15A1 or the pulse laser beam 15D1 according to the oscillation control signal 143E. The high-power/pulse laser oscillator 15E emits the high-power laser beam 15A1 or the pulse laser beam 15D1 on the coaxial path to the coaxialization device 18B.

As the configuration and method of switching the state that high-power/pulse laser oscillator 15E oscillates the high-power laser beam 15A1 or the pulse laser beam 15D1, for example, a method of using a compression device such as so-called "Q switch" is thought of. That is, the identical high-power/pulse laser oscillator 15E oscillates the pulse laser beam 15D1 in the condition that the compression device is optically connected and oscillates the high-power laser beam 15A1 as the continuous-wave in the condition that the compression device is optically removed. Here, the installation and removal of the compression device may be controlled through the oscillation control signal 143E by the control device 14.

The remaining configuration of the laser communication system 1 according to the present embodiment and each step of the laser communication method according to the present embodiment are same as in the first embodiment. Therefore, further detailed description is omitted.

The effect of the present embodiment will be described. As mentioned above, in the present embodiment, like the case of the eighth embodiment shown in FIG. 12, the area of the hole 2B to be formed in the obstacle 2 becomes smaller than in the seventh embodiment shown in FIG. 11. This leads to the saving of energy which is necessary to remove the obstacle 2 and the reduction of time to secure a transmission path. Moreover, because the number of laser oscillators decreases, the configuration of the laser communication system 1 can be simplified.

Tenth Embodiment

Figure 14:
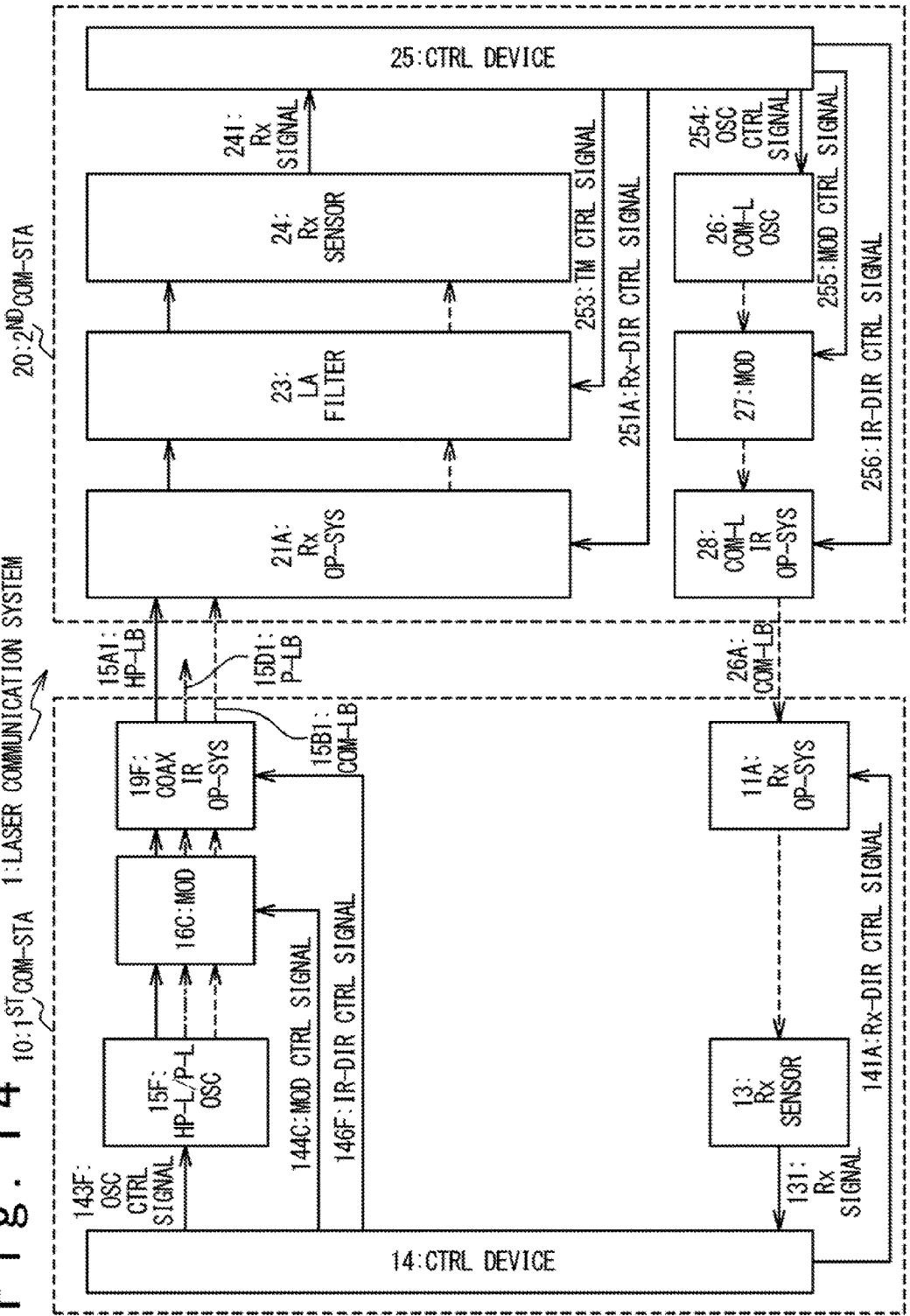
FIG. 14 is a block circuit diagram showing a configuration example of the laser communication system according to a tenth embodiment.

FIG. 14 is a block circuit diagram showing a configuration example of the laser communication system 1 according to the tenth embodiment. The laser communication system 1 according to the present embodiment shown in FIG. 14 has the following different points, compared with the laser communication system 1 according to the fifth embodiment shown in FIG. 9. That is, in the present embodiment, the common laser oscillator generates the pulse laser beam 15D1 in the first communication station 10 in addition to the high-power laser beam 15A1 and the communication laser beam 15B1.

Specifically, the high-power/communication laser oscillator 15C according to the fifth embodiment is replaced with a high-power/pulse/communication laser oscillator (HP-L/P-L/COM-L OSC) 15F which can oscillate the pulse laser beam 15D1. At the same time, it is desirable to replace the modulator 16B and the coaxial irradiation optical system 19C in the fifth embodiment with a modulator (MOD) 16C and a coaxial irradiation optical system (COAX IR OP-SYS) 19F which endure the intensity of the pulse laser beam 15D1, respectively. As a result, the present embodiment is suitable for the application of removing the obstacle 3 of water droplets by the irradiation of the pulse laser beam 15D1, while keeping the area of the hole 2B to be formed in the obstacle 2 small.

The connection relation of the high-power laser oscillator 15F, the pulse/the communication, the modulator 16C and the coaxial irradiation optical system 19F will be described. When paying attention to the optical connection relation, the high-power/pulse/communication laser oscillator 15F is arranged in the front stage of the modulator 16C and the modulator 16C is arranged in the front stage of the coaxial irradiation optical system 19F. When paying attention to the electrical connection relation, the high-power/pulse/communication laser oscillator 15F, the modulator 16C and the coaxial irradiation optical system 19F are connected with the control device 14.

The operation of components of the first communication station 10 according to the high-power/pulse/communication laser oscillator 15F, the modulator 16C and the coaxial irradiation optical system 19F will be described.

The control device 14 generates an oscillation control (OSC CTRL) signal 143F to control the oscillation of each laser beam. The control device 14 transmits the oscillation control signal 143F to the high-power/pulse/communication laser oscillator 15F. The high-power/pulse/communication laser oscillator 15F receives the oscillation control signal 143F. Therefore, the high-power/pulse/communication laser oscillator 15F oscillates the high-power laser beam 15A1, the pulse laser beam 15D1 or the communication laser beam 15B1 according to the oscillation control signal 143F. The high-power/pulse/communication laser oscillator 15F emits the high-power laser beam 15A1, the pulse laser beam 15D1 or the communication laser beam 15B1 on the optical coaxial path to the modulator 16C. The modulator 16C receives the high-power laser beam 15A1, the pulse laser beam 15D1 or the communication laser beam 15B1.

The control device 14 generates a modulation control signal (MOD CTRL) 144C to control the modulation of the communication laser beam 15B1. The control device 14 transmits the modulation control signal 144C to the modulator 16C. The modulator 16C receives the modulation control signal 144C. Therefore, the modulator 16C modulates the communication laser beam 15B1 according to the modulation control signal 144C. The modulator 16C emits the modulated communication laser beam 15B1, the received high-power laser beam 15A1 or the pulse laser beam 15D1 on the optical coaxial path to the coaxial irradiation optical system 19F. The coaxial irradiation optical system 19F receives the high-power laser beam 15A1, the pulse laser beam 15D1 or the communication laser beam 15B1.

The control device 14 generates an irradiation direction control (IR-DIR CTRL) signal 146F to control the irradiation direction of the high-power laser beam 15A1, the pulse laser beam 15D1 or the communication laser beam 15B1. The control device 14 transmits the irradiation direction control signal 146F to the coaxial irradiation optical system 19F. The coaxial irradiation optical system 19F receives the irradiation direction control signal 146F. Therefore, the coaxial irradiation optical system 19F adjusts the irradiation direction of the high-power laser beam 15A1, the pulse laser beam 15D1 or the communication laser beam 15B1 according to the irradiation direction control signal 146F. The coaxial irradiation optical system 19F irradiates the high-power laser beam 15A1, the pulse laser beam 15D1 or the communication laser beam 15B1 to the adjusted irradiation direction.

The remaining configuration of the laser communication system 1 according to the present embodiment and each step of the laser communication method according to the present embodiment are same as in the fifth embodiment. Therefore, further detailed description is omitted.

The effect of the present embodiment will be described. As mentioned above, the present embodiment can be applied to a case of removing the obstacle 3 of water droplets by the irradiation of the pulse laser beam 15D1 while keeping the area of the hole 2B to be formed in the obstacle 2 small.

Eleventh Embodiment

Figure 15:
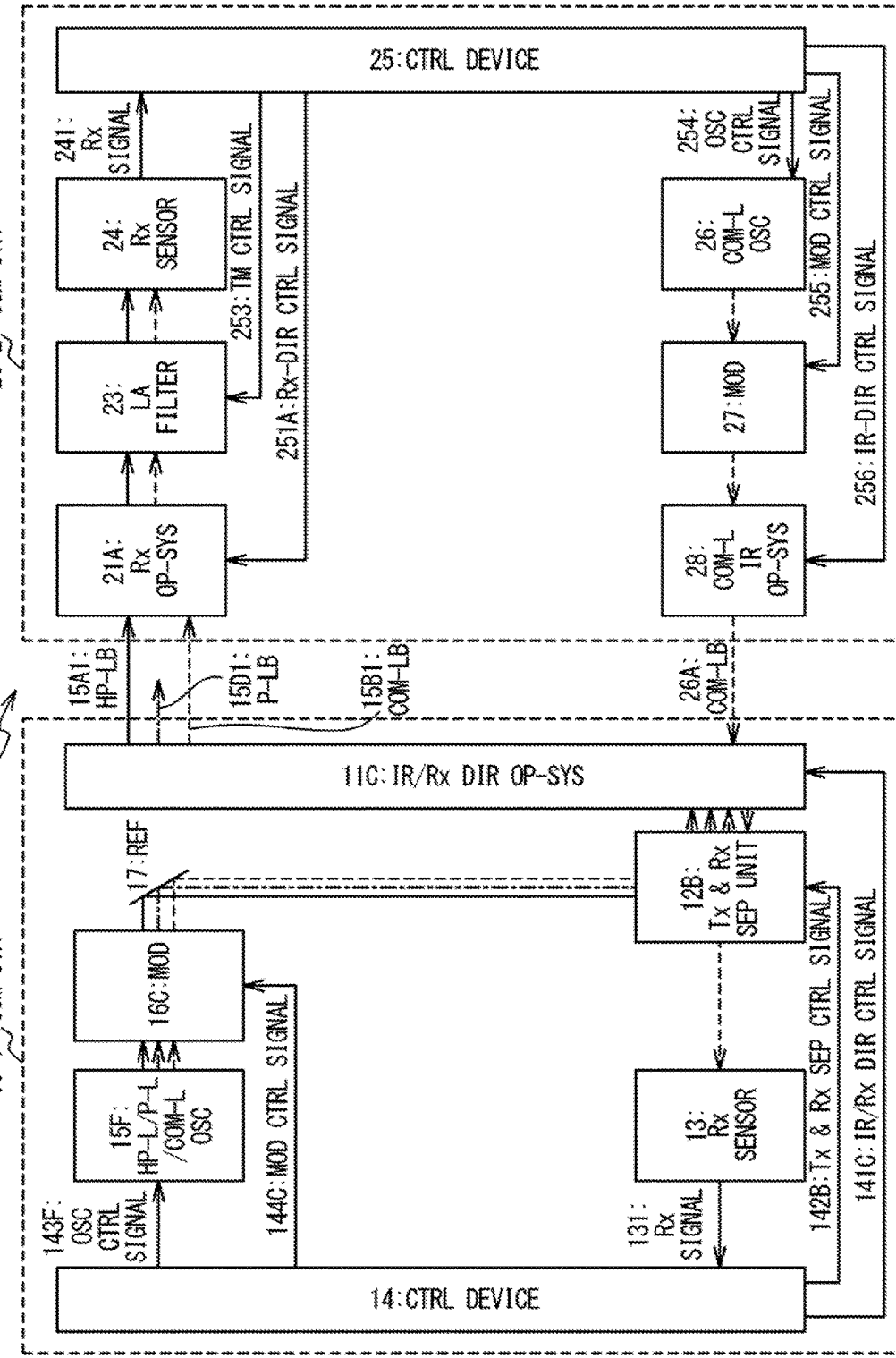
FIG. 15 is a block circuit diagram showing a configuration example of the laser communication system according to an eleventh embodiment.

FIG. 15 is a block circuit diagram showing a configuration example of the laser communication system 1 according to an eleventh embodiment. The laser communication system 1 according to the present embodiment has the following different points, compared with the laser communication system 1 according to the sixth embodiment shown in FIG. 10. That is, in the present embodiment, the common laser oscillator which generates the high-power laser beam 15A1 and the communication laser beam 15B1 further generates the pulse laser beam 15D1 in the first communication station 10.

Specifically, the high-power/communication laser oscillator 15C according to the sixth embodiment is replaced with the high-power/pulse/communication laser oscillator 15F, which can oscillate the pulse laser beam 15D1. At the same time, it is desirable that the modulator 16B, the transmission/reception separating unit 12A and the transmission and reception/reception coaxial optical system 11B according to the sixth embodiment are replaced with the modulator 16C, the transmission and reception separating (Tx & Rx SEP) unit 12B and the coaxial irradiation optical system 19F to endure the intensity of pulse laser beam 15D1, respectively. As a result, the present embodiment can be applied to remove the obstacle 3 of water droplets by the irradiation of pulse laser beam 15D1, while keeping the area of the hole 2B to be formed in the obstacle 2 small.

The connection relation of components of the first communication station 10 according to the high-power/pulse/communication laser oscillator 15F, the modulator 16C, the transmission and reception separating unit 12B and the coaxial irradiation optical system 19F according to the present embodiment will be described.

When paying attention to the optical connection relation, the high-power/pulse/communication laser oscillator 15F is connected with the modulator 16C. The modulator 16C is connected at one end with the high-power/pulse/communication laser oscillator 15F and is connected at the other end with the transmission/reception separating unit 12B through the reflector 17. The transmission/reception separating unit 12B is connected at one end with the modulator 16C through the reflector 17 and is connected at another end with the irradiation/reception optical system 11C, and is connected at another end with the reception sensor 13.

In case where the first communication station 10 is irradiated with the laser beam from the second communication station 20, the irradiation/reception optical system 11C is arranged in the front stage of the transmission and reception separating unit 12B and the transmission and reception separating unit 12B is arranged in the front stage of the reception sensor 13. In case where the second communication station 20 is irradiated with the laser beam from the first communication station 10, the high-power/pulse/communication laser oscillator 15F is arranged in the front stage of the modulator 16C. The modulator 16C is arranged in the front stage of the transmission and reception separating unit 12B through the reflector 17, and the transmission and reception separating unit 12B is arranged in the front stage of the irradiation/reception optical system 11C.

Also, when paying attention to the electrical connection relation, the high-power/pulse/communication laser oscillator 15F, the modulator 16C, and the transmission and reception separating unit 12B and the irradiation/reception optical system 11C are connected with the control device 14.

The operation of components of the first communication station 10 according to the high-power/pulse/communication laser oscillator 15F, the modulator 16C, the transmission/reception separating unit 12B and the irradiation/reception optical system 11C will be described.

The operation of the high-power/pulse/communication laser oscillator 15F and the modulator 16C according to the present embodiment is same as in the high-power/pulse/communication laser oscillator 15F and the modulator 16C according to the tenth embodiment shown in FIG. 14. Therefore, further detailed description is omitted.

The operation of transmission/reception separating unit 12B according to the present embodiment is different in the following points from that of the transmission/reception separating unit 12A according to the sixth embodiment shown in FIG. 10. That is, the pulse laser beam 15D1 is irradiated to the irradiation/reception optical system 11C, in addition to the high-power laser beam 15A1 and the communication laser beam 15B1. The other operation of the transmission/reception separating unit 12B according to the present embodiment is same as in the sixth embodiment. Therefore, further detailed description is omitted.

The operation of the irradiation/reception optical system 11C according to the present embodiment is different in the following points from that of the irradiation/reception coaxial optical system 11B according to the sixth embodiment shown in FIG. 10. That is, the pulse laser beam 15D1 is irradiated in addition to the high-power laser beam 15A1 and the communication laser beam 15B1. The other operation of the irradiation/reception optical system 11C according to the present embodiment is same as in the sixth embodiment. Therefore, further detailed description is omitted.

The remaining configuration of the laser communication system 1 according to the present embodiment and each step of the laser communication method according to the present embodiment are same as in the first embodiment. Therefore, further detailed description is omitted.

The effect of the present embodiment will be described. As mentioned above, while keeping the area of the hole 2B to be formed in the obstacle 2 small, the present embodiment can be applied to the application of removing the obstacle 3 of water droplets by irradiation of the pulse laser beam 15D1.

Twelfth Embodiment

Each step of the laser communication method using the laser communication system 1 of the first to eleventh embodiments shown in FIG. 3 and FIG. 6 to FIG. 15 has been described with reference to the flow chart shown in FIG. 4. Another variation of the laser communication method using the laser communication system 1 of the first to eleventh embodiments will be described below as a twelfth embodiment, with reference to FIG. 16 and FIG. 17A to FIG. 17D.

The laser communication method according to the present embodiment is different in the following points from the first embodiment shown in FIG. 4. That is, in the sixth step S106 of the first embodiment, the output level of the laser beam is changed rapidly to the low output level for communication from the high-power level of removing the obstacle 2.

However, in the present embodiment, the first communication station 10 drops the output level of the high-power laser beam 15A1 step-by-step. The second communication station 20 raises the transmittance of the light-attenuating filter 23 step-by-step. These step-by-step adjustments are realized by repeating the processing of the fourth step S204 to the seventh step S207.

Figure 16:
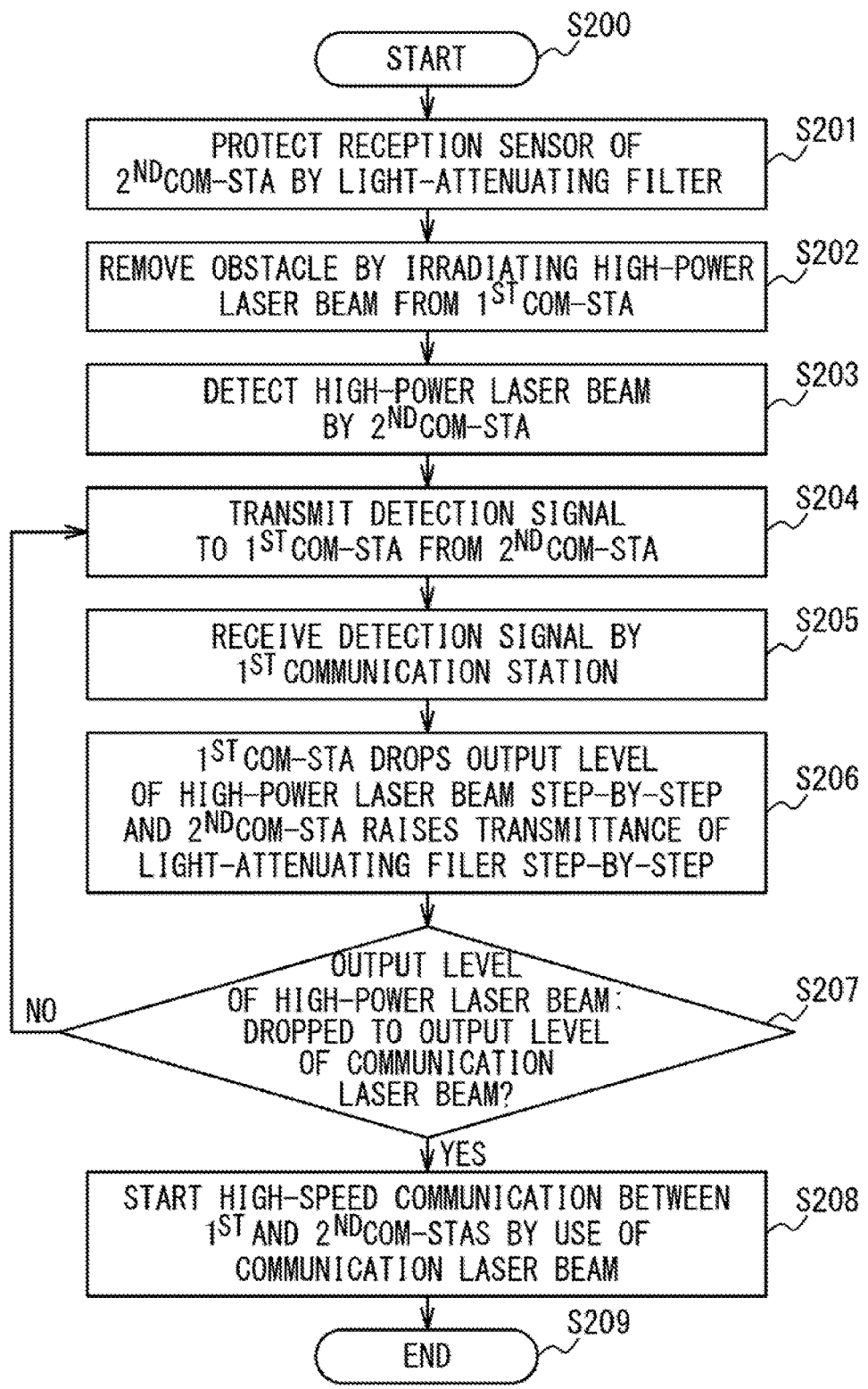
FIG. 16 is a flow chart showing a configuration example of the laser communication method according to a twelfth embodiment.

FIG. 16 is a flow chart showing a configuration example of the laser communication method according to the twelfth embodiment. The flow chart of FIG. 16 contains 10 steps of a $0^{th}$ step S200 to the ninth step S209. The flow chart of FIG. 16 begins from the $0^{th}$ step S200. After the $0^{th}$ step S200, a first step S201 is executed.

At the first step S201, the second communication station 20 protects the reception sensor 24 by the light-attenuating filter 23. The first step S201 according to the present embodiment is the same as the first step S101 in the first embodiment shown in FIG. 4. Therefore, further detailed description is omitted. After the first step S201, a second step S202 is executed.

Figure 17A:
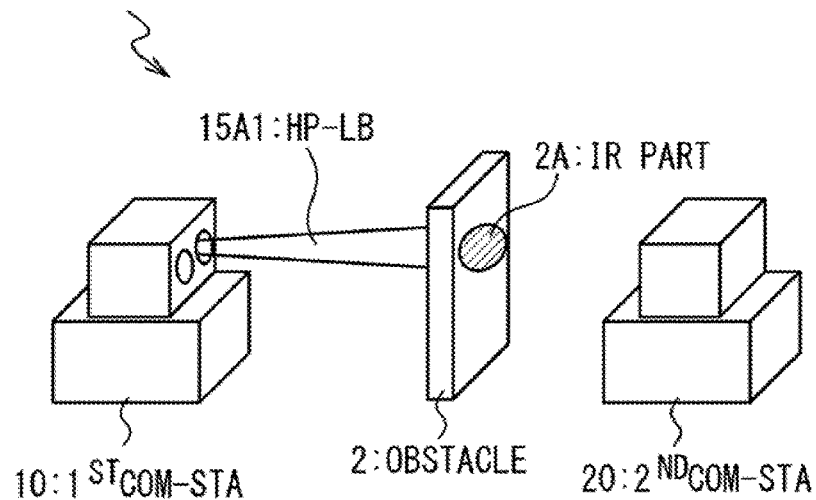
FIG. 17A is a diagram showing an example of state that the laser communication system according to the twelfth embodiment removes an obstacle with the high-power laser beam.

At the second step S202, the first communication station 10 irradiates the high-power laser beam 15A1 and removes the obstacle 2. The second step S202 according to the present embodiment is the same as the second step S102 in the first embodiment shown in FIG. 4. Therefore, further detailed description is omitted. FIG. 17A is a diagram showing an example of state that the laser communication system 1 according to the twelfth embodiment removes the obstacle 2 with the high-power laser beam 15A1. After the second step S202, a third step S203 is executed.

At the third step S203, the second communication station 20 detects the high-power laser beam 15A1. The third step S203 according to the present embodiment is the same as the third step S103, like the first embodiment shown in FIG. 4. Therefore, further detailed description is omitted. After the third step S203, a fourth step S204 is executed.

Figure 17B:
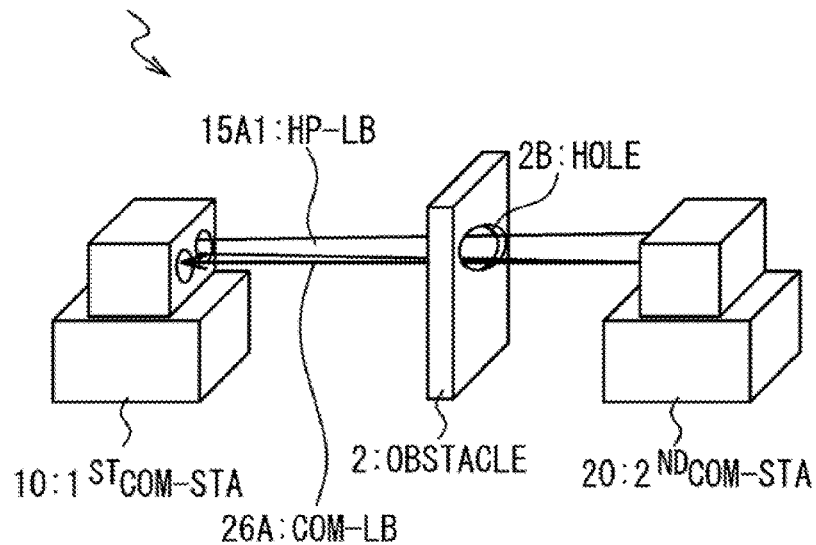
FIG. 17B is a diagram showing an example of state that the second communication station of the laser communication system according to the twelfth embodiment detects the high-power laser beam and transmits the detection signal.

At the fourth step S204, the second communication station 20 transmits a detection signal to the first communication station 10. The fourth step S204 according to the present embodiment is the same as the fourth step S104 in the first embodiment shown in FIG. 4. Therefore, further detailed description is omitted. FIG. 17B is a diagram showing an example of state that the second communication station 20 of the laser communication system 1 according to the twelfth embodiment detects the high-power laser beam 15A1 and transmits the communication laser beam 26A containing the detection signal. After the fourth step S204, a fifth step S205 is executed.

At the fifth step S205, the first communication station 10 receives the detection signal. The fifth step S205 according to the present embodiment is the same as the fifth step S105 in the first embodiment shown in FIG. 4. Therefore, further detailed description is omitted. Next, after the fifth step S205, a sixth step S206 is executed.

Figure 17C:
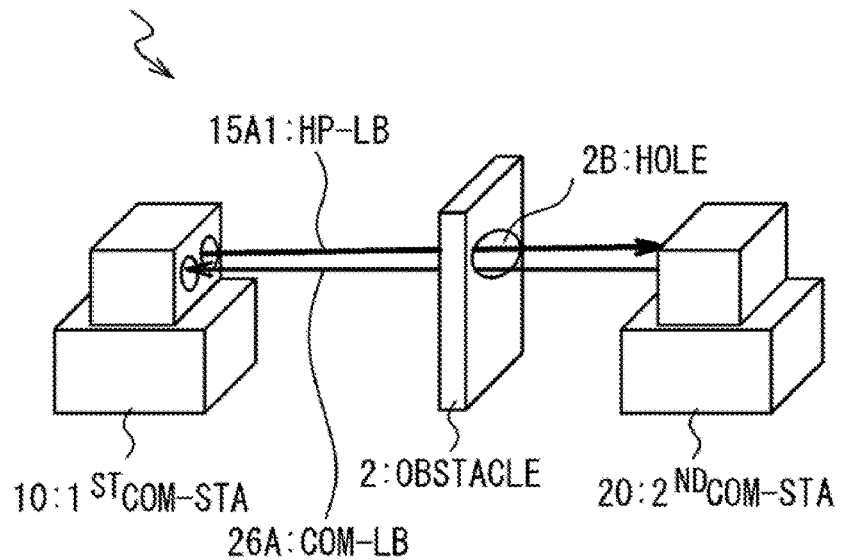
FIG. 17C is a diagram showing an example of state that the first communication station of the laser communication system according to the twelfth embodiment lowers the output level of the high-power laser beam step-by-step, and the second communication station raises the transmittance of a light-attenuating filter step-by-step.

At the sixth step S206, the first communication station 10 drops the output level of the high-power laser beam 15A1 step-by-step. When detecting that the intensity of the high-power laser beam 15A1 received by the reception sensor 24 dropped, the second communication station 20 raises the transmittance of the light-attenuating filter 23 step-by-step according to the intensity drop. As a specific method of raising the transmittance of the light-attenuating filter 23 step-by-step, a plurality of light-attenuating filters 23 with the different transmittances are prepared previously, and may be exchanged one after another. Or, a polarizing filter is used as the light-attenuating filter 23, and an angle between the polarization direction of the polarizing filter and the polarization direction of the high-power laser beam 15A1 may be change step-by-step. FIG. 17C is a diagram showing an example of state that the first communication station 10 of the laser communication system 1 according to the twelfth embodiment drops the output level of the high-power laser beam step-by-step and the second communication station 20 raises the transmittance of the light-attenuating filter step-by-step. After the sixth step S206, a seventh step S207 is executed.

At the seventh step S207, it is determined whether or not the intensity level of the high-power laser beam 15A1 is fallen to the intensity level of the communication laser beam 15B1. This determination may be carried out by the first communication station 10 which adjusts the intensity level of the high-power laser beam 15A1 or the second communication station 20 which receives the high-power laser beam 15A1. As a result of the determination, if the intensity level of the high-power laser beam 15A1 drops to the intensity level of the communication laser beam 15B1 (YES), an eighth step S208 is executed after the seventh step S207. In the other case (NO), a fourth step S204 is executed after the seventh step S207.

Figure 17D:
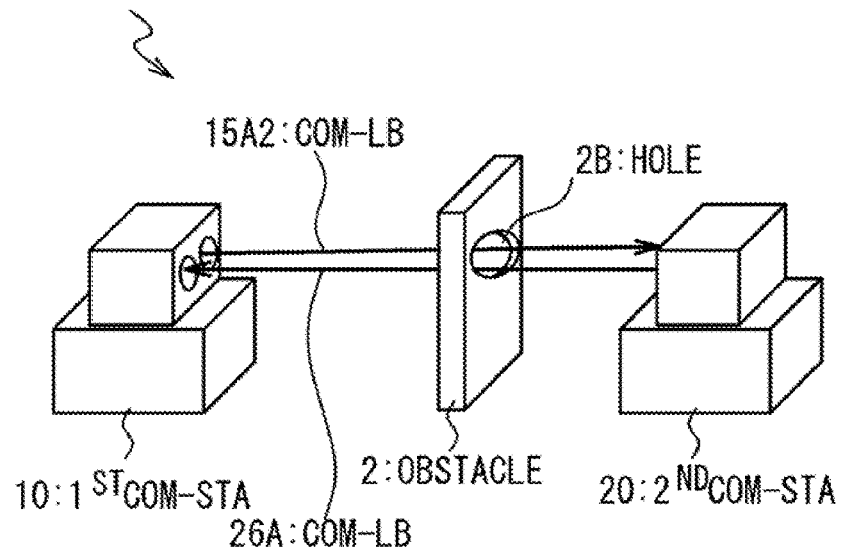
FIG. 17D is a diagram showing an example of state that the second communication station of the laser communication system according to the twelfth embodiment detects the laser beam of the communication level and starts high-speed communication.

At the eighth step S208, the first communication station 10 and the second communication station 20 start the high-speed communication using the communication laser beam 15B1. FIG. 17D is a diagram showing an example of state that the second communication station 20 of the laser communication system 1 according to the twelfth embodiment detects the output level of the communication laser beam and starts the high-speed communication. A ninth step S209 is executed after the eighth step S208, and the flow chart of FIG. 16 ends.

As described above, in the laser communication system 1 and the laser communication method according to the present embodiment, the confirmation of securement of the transmission path between the communication stations is carried out by the following scheme:
(1) The reception sensor 24 is protected by the light-attenuating filter 23 until the transmission path is established (the first step S201).
(2) After passing through the obstacle 2 (the second step S202), the detection signal is transmitted to the first communication station 10 (the fourth step S204), when the second communication station 20 receives the high-power laser beam 15A1 (the third step S203).
(3) When receiving the detection signal from the second communication station 20 (the fifth step S205), the first communication station 10 drops the intensity level of the laser beam to be outputted by a constant level for each step (the sixth step S206).
(4) The second communication station 20 raises the transmittance of the light-attenuating filter 23 by the constant level for each step according to the drop of the intensity level (the sixth step S206).
(5) If the intensity level of the laser beam irradiated from the first communication station 10 drops to the same level as the output level of the communication laser beam (the seventh step S207), the high-speed communication is started (the eighth step S208).

In this way, in the present embodiment, by changing the transmittance of the light-attenuating filter 23 step-by-step, it is possible to prevent more surely that the reception sensor 24 of the second communication station 20 is damaged by the high-power laser beam 15A1.

Especially, such protection is effective when the second communication station 20 cannot be distinguished between the drop of the reception level when the transmission path in which the spatial laser communication is carried out between the first communication station 10 and the second communication station 20 is covered by the obstacle 2 and the drop of the output level of the laser beam by the adjustment of the first communication station 10. That is, if a step-by-step change is not carried out, when an obstruction factor is removed after the output level of the laser beam received by the second communication station 20 drops with the obstruction factor such as the obstacle 2, there is a fear that the high-power laser beam 15A1 is incident directly on the reception sensor 24 so that the reception sensor 24 is damaged. As in the present embodiment, in case where a step-by-step change is carried out, if the output level of the received laser beam rapidly drops after the reception signal is transmitted, it is possible to determine that the high-power laser beam 15A1 was obstructed. Therefore, the protected state of the reception sensor 24 is maintained by the light-attenuating filter 23, and when the obstruction factor is removed, the reception sensor 24 can be protected from the high-power laser beam 15A1.

Thirteenth Embodiment

Another variation of the laser communication method using the laser communication system 1 of any of the first to eleventh embodiments will be described as a thirteenth embodiment, with reference to FIG. 18A, FIG. 18B, and FIG. 19A to FIG. 19D.

The laser communication method according to the present embodiment is different in the following points from the case of the twelfth embodiment shown in FIG. 16. That is, in the twelfth embodiment, the second communication station 20 transmits the detection signal at the fourth step S204, and when the first communication station 10 receives this detection signal at the fifth step S205, at the sixth step S206, the first communication station 10 drops the output level of the high-power laser beam 15A1 step-by-step and the second communication station 20 raises the transmittance of the light-attenuating filter 23 step-by-step. However, in the present embodiment, the second communication station 20 transmits the detection signal at the fourth step S304, and after the first communication station 10 receives the detection signal at the fifth step S305, further communication is carried out between the first communication station 10 and the second communication station 20. Then, the step-by-step change is carried out in the output level of the high-power laser beam 15A1 and the transmittance of the light-attenuating filter 23. This further communication is executed in the sixth step S306 to the ninth step S309.

Figure 18A:
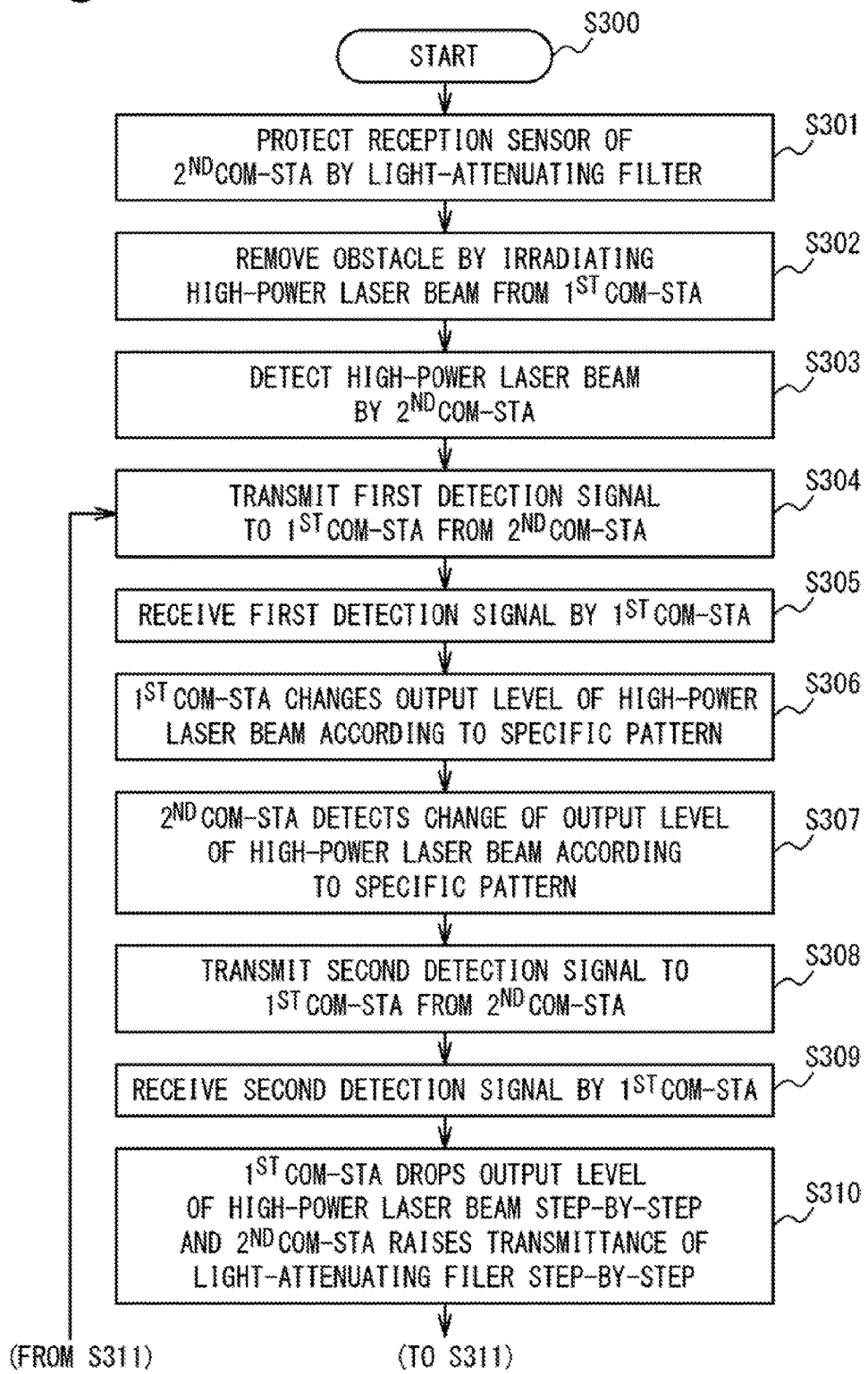
FIG. 18A is a first half of a flow chart showing a configuration example of the laser communication method according to a thirteenth embodiment.
Figure 18B:
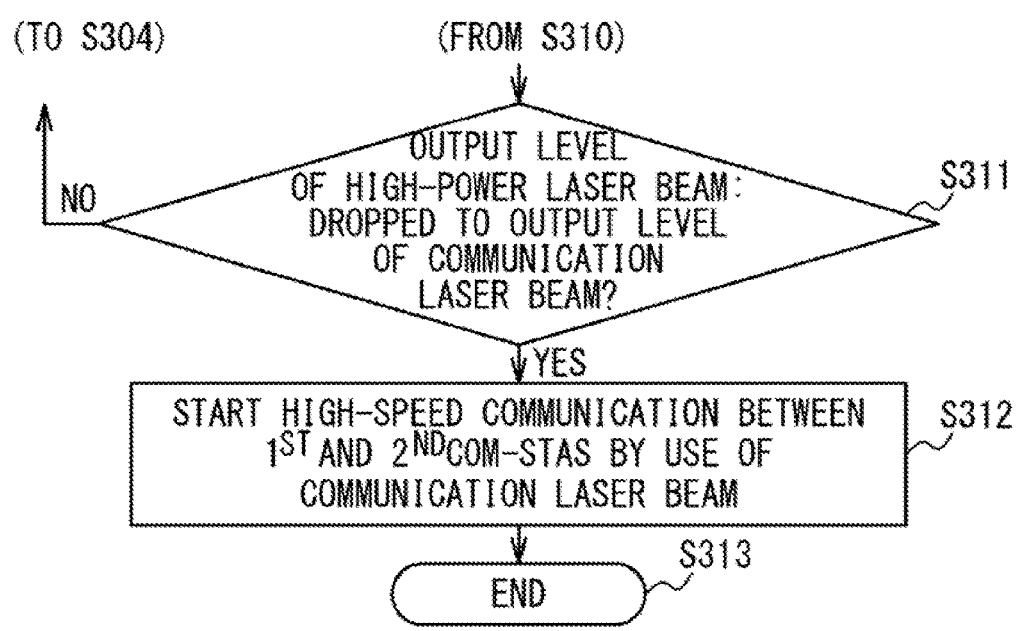
FIG. 18B is a second half part of the flow chart showing the configuration example of the laser communication method according to the thirteenth embodiment.

FIG. 18A and FIG. 18B show the flow chart showing a configuration example of the laser communication method according to the thirteenth embodiment. The flow chart of FIG. 18A and FIG. 18B contains 14 steps of a $0^{th}$ step S300 to a thirteenth step S313. The flow chart of FIG. 18A and FIG. 18B begins from the $0^{th}$ step S300. After the $0^{th}$ step S300, a first step S301 is executed.

At the first step S301, the second communication station 20 protects the reception sensor 24 by the light-attenuating filter 23. The first step S301 according to the present embodiment is the same as the first step S201 of the twelfth embodiment shown in FIG. 16. Therefore, further detailed description is omitted. After the first step S301, a second step S302 is executed.

Figure 19A:
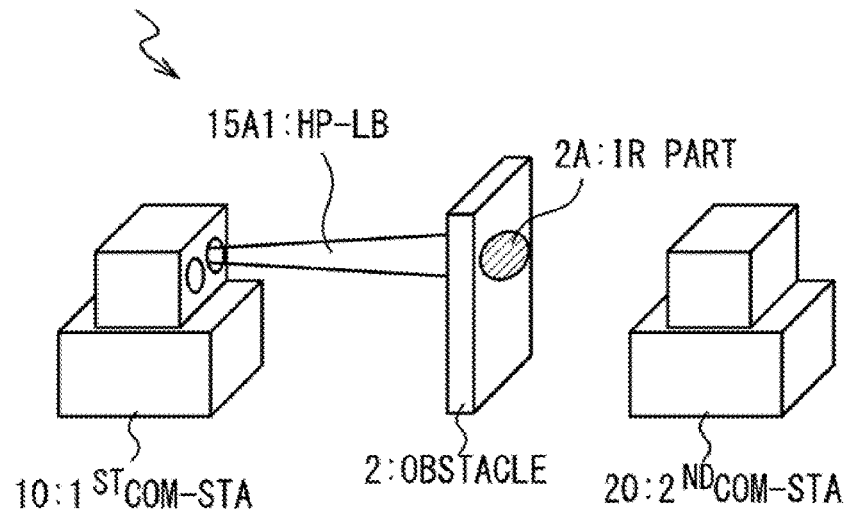
FIG. 19A is a diagram showing an example of state that the laser communication system according to the thirteenth embodiment removes an obstacle with the high-power laser beam.

At the second step S302, the first communication station 10 irradiates the high-power laser beam 15A1 and removes the obstacle 2. The second step S302 according to the present embodiment is the same as the second step S202 of the twelfth embodiment shown in FIG. 16. Therefore, further detailed description is omitted. FIG. 19A is a diagram showing an example of state that the laser communication system 1 according to the thirteenth embodiment removes the obstacle 2 with the high-power laser beam 15A1. After the second step S302, a third step S303 is executed.

At the third step S303, the second communication station 20 detects the high-power laser beam 15A1. The third step S303 according to the present embodiment is the same as the third step S203 of the twelfth embodiment shown in FIG. 16. Therefore, further detailed description is omitted. After the third step S303, a fourth step S304 is executed.

Figure 19B:
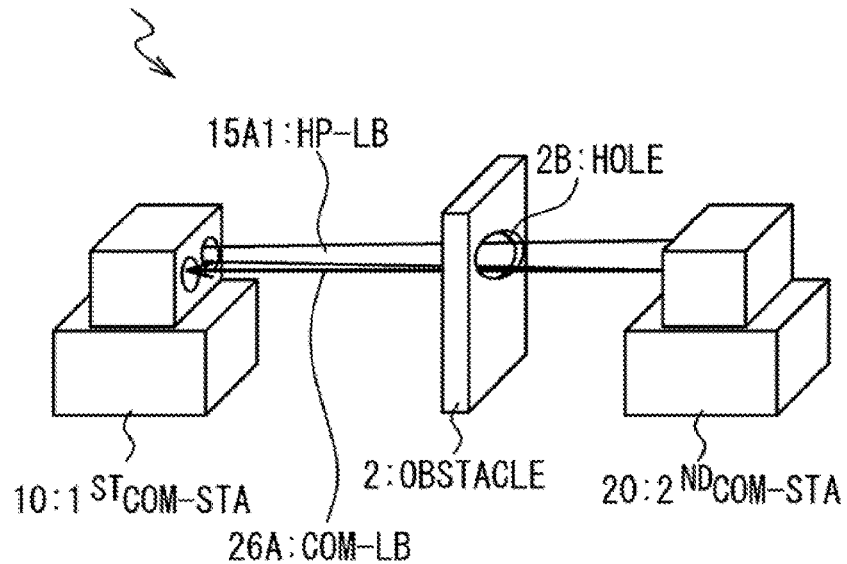
FIG. 19B is a diagram showing an example of state that the second communication station of the laser communication system according to the thirteenth embodiment detects the high-power laser beam and transmits the detection signal.

At the fourth step S304, the second communication station 20 transmits the first detection signal to the first communication station 10. The fourth step S304 according to the present embodiment is the same as the fourth step S204 of the twelfth embodiment shown in FIG. 16. Therefore, further detailed description is omitted. FIG. 19B is a diagram showing an example of state that the second communication station 20 of the laser communication system 1 according to the thirteenth embodiment detects the high-power laser beam 15A1 and transmits the communication laser beam 26A which contains the first detection signal. After the fourth step S304, a fifth step S305 is executed.

At the fifth step S305, the first communication station 10 receives the first detection signal. The fifth step S305 according to the present embodiment is the same as the fifth step S205 of the twelfth embodiment shown in FIG. 16. Therefore, further detailed description is omitted. Next, a sixth step S306 is executed after the fifth step S305.

At the sixth step S306, the first communication station 10 changes the output level of the high-power laser beam 15A1 in a specific pattern. This specific pattern may be, for example, a pattern in which a lighting-up state of a predetermined output level and a going-out state is repeated in a predetermined interval, or may be a pattern in which an output level is changed step-by-step or continuously between the plurality of output levels. In any case, it is desirable that data showing this specific pattern is previously stored in the control device 25 and the storage unit (not shown) such that the second communication station 20 can detect the change of the output level of the high-power laser beam 15A1. After the sixth step S306, a seventh step S307 is executed.

At the seventh step S307, the second communication station 20 detects the specific pattern of the change of the output level of the high-power laser beam 15A1. After the seventh step S307, an eighth step S308 is executed.

At the eighth step S308, the second communication station 20 transmits the second detection signal to the first communication station 10. This second detection signal is transmitted as the communication laser beam 26A, like the first detection signal transmitted at the fourth step S304. After the eighth step S308, a ninth step S309 is executed.

At the ninth step S309, the first communication station 10 receives the second detection signal. After the ninth step S309, a tenth step S310 is executed.

Figure 19C:
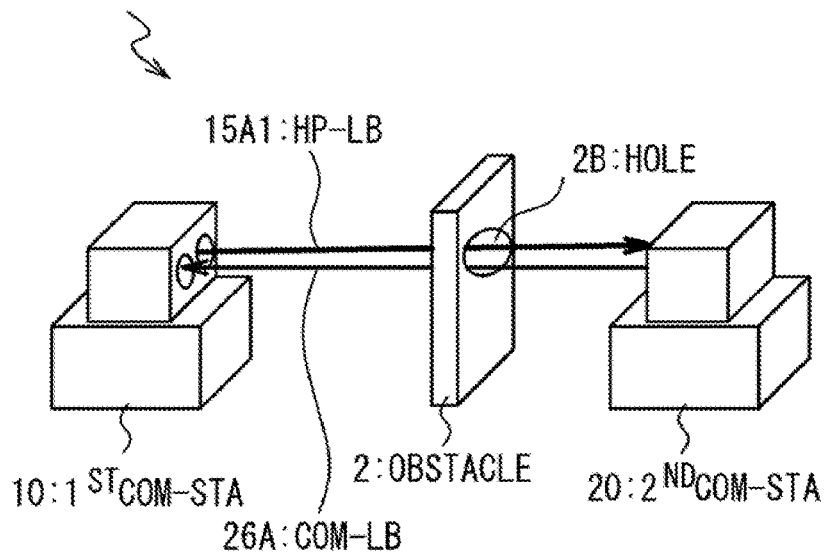
FIG. 19C is a diagram showing an example of state that the first communication station of the laser communication system according to the thirteenth embodiment lowers the output level of the high-power laser beam step-by-step.

At the tenth step S310, the first communication station 10 drops the output level of the high-power laser beam 15A1 step-by-step. The second communication station 20 raises the transmittance of the light-attenuating filter 23 step-by-step. The method of raising the transmittance of the light-attenuating filter 23 step-by-step is same as in the sixth step S206 shown in FIG. 16. Therefore, further detailed description is omitted. FIG. 19C is a diagram showing an example of state that the first communication station 10 of the laser communication system 1 according to the thirteenth embodiment drops the output level of the high-power laser beam step-by-step, and the second communication station 20 raises the transmittance of the light-attenuating filter 23 step-by-step. After the tenth step S310, an eleventh step S311 is executed.

At the eleventh step S311, it is determined whether or not the intensity level of the high-power laser beam 15A1 drops to the intensity level of the communication laser beam 15B1. The eleventh step S311 according to the present embodiment is same as seventh step S207 according to the twelfth embodiment shown in FIG. 16. Therefore, further detailed description is omitted. As the result of the determination, if the intensity level of the high-power laser beam 15A1 has dropped to the intensity level of the communication laser beam 15B1 (YES), a twelfth step S312 is executed after the eleventh step S311. In the other case (NO), the fourth step S304 is executed after the eleventh step S311.

Figure 19D:
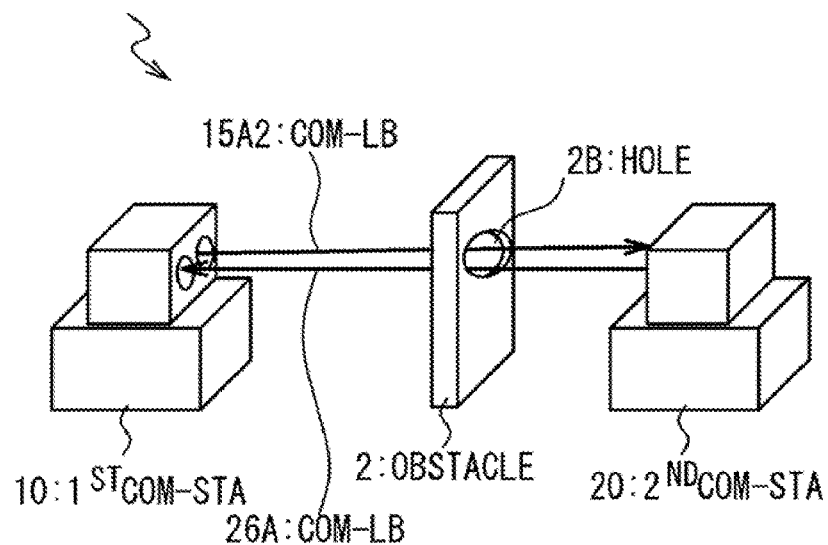
FIG. 19D is a diagram showing an example of state that the second communication station of the laser communication system according to the thirteenth embodiment raises the transmittance of the light-attenuating filter step-by-step, and detects the laser beam of the communication level to start the high-speed communication.

At the twelfth step S312, the first communication station 10 and the second communication station 20 start the high-speed communication using the communication laser beam 15B1. FIG. 19D is a diagram showing an example of state that the first communication station 10 and the second communication station 20 in the laser communication system 1 according to the thirteenth embodiment start the high-speed communication. After the twelfth step S312, a thirteenth step S313 is executed and the flow chart of FIG. 18 ends.

As described above, in the laser communication system 1 and the laser communication method according to the present embodiment, the confirmation of securement of the transmission path between the communication stations is carried out in the following method:

(1) Until the transmission path is established, the reception sensor 24 is protected by the light-attenuating filter 23 (the first step S301).

(2) After passing through the obstacle 2 (the second step S302), the second communication station 20 receives the high-power laser beam 15A1 (the third step S303), transmits the first detection signal to the first communication station 10 (the fourth step S304).

(3) When receiving the first detection signal from the second communication station 20 (the fifth step S205), the first communication station 10 changes the intensity level of the laser beam to be outputted in the specific pattern (the sixth step S306).

(4) When detecting a change of the laser beam in the specific pattern (the seventh step S307), the second communication station 20 transmits the second detection signal to the first communication station 10 (the eighth step S308).

(5) When receiving the second detection signal (the ninth step S309), the first communication station 10 drops the intensity level of the laser beam to be outputted step-by-step in a constant level for each step (the tenth step S310).

(6) The second communication station 20 raises the transmittance of the light-attenuating filter 23 step-by-step in a constant level for each step, according to the drop of the output level of the laser beam (the tenth step S310).

(7) The above-mentioned (3)-(6) is repeated, and when the intensity level of the laser beam irradiated by the first communication station 10 drops to the intensity level for the communication laser beams (the eleventh step S311), the high-speed communication is started (the twelfth step S312).

In this way, in the present embodiment, since the timing to change the transmittance of the light-attenuating filter 23 step-by-step is clearly defined based on the communication, the reception sensor 24 can be protected more surely.

The present invention which was accomplished by the inventors has been specifically described based on the embodiments. However, the present invention is not limited to the embodiments. Various changes or modification can be carried out in a range without deviate from the gist of the present invention. Also, the features described in the embodiments can be freely combined in a range without technical contradiction.

EXPLANATION OF REFERENCE NUMERALS

1: laser communication system
10: first communication station (1$^{st}$ COM-STA)
11A: reception optical system (Rx OP-SYS)
11B: irradiation/reception coaxial optical system (IR/Rx COAX OP-SYS)
11C: irradiation/reception coaxial optical system (IR/Rx COAX OP-SYS)
12A: transmission and reception separating (Tx & Rx SEP) unit
12B: transmission and reception separating (Tx & Rx SEP) unit
13: reception (Rx) sensor
131: reception (Rx) signal
14: control (CTRL) devices
141A: reception direction control (Rx-DIR CTRL) signal
141B: irradiation/reception direction control (IR/Rx DIR CTRL) signal
141C: irradiation/reception direction control (IR/Rx DIR CTRL) signal
142A transmission and reception separation control (Tx & Rx SEP CTRL) signal
142B: transmission and reception separation control (Tx & Rx SEP CTRL) signal
143A: oscillation control (OSC CTRL) signal
143B: oscillation control (OSC CTRL) signal
143C: oscillation control (OSC CTRL) signal
143D: oscillation control (OSC CTRL) signal
143E: oscillation control (OSC CTRL) signal
143F: oscillation control (OSC CTRL) signal
144A: modulation control (MOD CTRL) signal
144B: modulation control (MOD CTRL) signal
144C: modulation control (MOD CTRL) signal
145A: coaxialization control (COAX CTRL) signal
145B: coaxialization control (COAX CTRL) signal
146A: irradiation direction control (IR-DIR CTRL) signal
146B: irradiation direction control (IR-DIR CTRL) signal
146C: irradiation direction control (IR-DIR CTRL) signal
146D: irradiation direction control (IR-DIR CTRL) signal
146E: irradiation direction control (IR-DIR CTRL) signal
146F: irradiation direction control (IR-DIR CTRL) signal
15A: high-power laser oscillator (HP-L OSC)
15A1 high-power laser beam (HP-LB)
15A2: communication laser beam (COM-LB)
15B: communication laser oscillator (COM-L OSC)
15B1: communication laser beam (COM-LB)
15C high-power/communication laser oscillator (HP-L/COM-L OSC)
15D: pulse laser oscillator (P-L OSC)
15D1: pulse laser beam (P-LB)
15E: high-power/pulse laser oscillator (HP-L/P-L OSC)
15F: high-power/pulse/communication laser oscillator (HP-L/P-L/COM-L OSC)
16A: modulator (MOD)
16B: modulator (MOD)
16C: modulator (MOD)
17: reflector (REF)
18A: coaxialization (COAX) device
18B: coaxialization (COAX) device
19A: high-power laser irradiation optical system (HP-L IR OP-SYS)
19B: communication laser irradiation optical system (COM-L IR OP-SYS)
19C: coaxial irradiation optical system (COAX IR OP-SYS)
19D: pulse laser irradiation optical system (P-L IR OP-SYS)
19E: coaxial irradiation optical system (COAX IR OP-SYS)
19F: coaxial irradiation optical system (COAX IR OP-SYS)
20: second communication station (2$^{nd}$ COM-STA)
21A: reception optical system (Rx OP-SYS)
21B: irradiation/reception coaxial optical system (IR/Rx COAX OP-SYS)
22: transmission and reception separating (Tx & Rx SEP) unit
23: light-attenuating (LA) filter
24: reception (Rx) sensor
241: reception (Rx) signal
25: control (CTRL) device
251A: reception direction control (Rx-DIR CTRL) signal
251B: irradiation/reception direction control (IR/Rx DIR CTRL) signal
252: transmission and reception separation control (Tx/Rx SEP CTRL) signal
253: transmittance control (TM CTRL) signal
254: oscillation control (OSC CTRL) signal
255: modulation control (MOD CTRL) signal
256: irradiation direction control (IR-DIR CTRL) signal
26: communication laser oscillator (COM-L OSC)
26A: communication laser beam (COM-LB)
27: modulator (MOD)
28: irradiation optical systems (IR OP-SYS)
2: obstacle
2A: irradiation (IR) part
2B: hole
3: obstacle
100: first communication station (1$^{st}$ COM-STA)
200: second communication station (2$^{nd}$ COM-STA)
300: communication laser beam (COM-LB)
400: high-power laser irradiation (HP-L IR) apparatus
410: high-power laser oscillator (HP-L OSC)
420: irradiation optical system (IR OP-SYS)
430: high-power laser beam (HP-LB)
500: target
510: irradiation (IR) part

The invention claimed is:

1. A laser communication system comprising:
a first communication station; and
a second communication station configured to carry out a laser optical communication with the first communication station,
wherein the first communication station comprises a high-power laser oscillator configured to generate a high-power laser beam which can be used to remove a solid body.

2. The laser communication system according to claim 1, wherein the first communication station further comprises:
a communication laser oscillator configured to generate a communication laser beam used for the laser optical communication; and a control device configured to control an operation of the high-power laser oscillator and an operation of the communication laser oscillator.

3. The laser communication system according to claim 2, wherein the first communication station further includes a pulse laser oscillator configured to generate a pulse laser beam used to remove water droplets.

4. The laser communication system according to claim 2, wherein the high-power laser oscillator further generates a pulse laser beam used to remove water droplets.

5. The laser communication system according to claim 2, wherein the first communication station further comprises:
an irradiation optical system configured to irradiate a received laser beam to the second communication station; and
an auxiliary optical system configured to lead a plurality of laser beams generated by different laser oscillators to an input of the irradiation optical system, and
wherein the irradiation optical system outputs the received laser beam on a first optical axis.

6. The laser communication system according to claim 5, wherein the first communication station further comprises a reception sensor configured to receive another communication laser beam irradiated from the second communication station, and
wherein the irradiation optical system receives the communication laser beam on the first optical axis to lead to an input of the reception sensor.

7. The laser communication system according to claim 2, wherein the first communication station further comprises:
a reception sensor configured to receive another communication laser beam irradiated from the second communication station, and
a transmission and reception optical system configured to irradiate the communication laser beam to a first optical axis for the second communication station, and receive the other communication laser beam on a second optical axis to lead to an input of the reception sensor, and
wherein the first optical axis and the second optical axis coincide with each other.

8. The laser communication system according to claim 2, wherein the second communication station comprises:
a reception sensor configured to receive the communication laser beam from the first communication station;
a reception optical system configured to receive the communication laser beam to lead to the reception sensor; and
a light-attenuating filter configured to protect the reception sensor from the high-power laser beam,
wherein a transmittance of the light-attenuating filter is variable,
wherein the second communication station further comprises a control device configured to control the transmittance of the light-attenuating filter.

9. The laser communication system according to claim 8, wherein the second communication station further comprises another communication laser oscillator configured to generate a detection signal configured to transmit to the first communication station that a reception sensor detected a high-power laser beam,
wherein the control device of the first communication station carries out a control to reduce an output level of the high-power laser beam step-by-step when receiving the detection signal, and
wherein the control device of the second communication station carries out a control to raise the transmittance of the light-attenuating filter step-by-step as the output level of the high-power laser beam is reduced.

10. The laser communication system according to claim 8, further comprising:
a communication laser oscillator configured to generate a first detection signal configured to inform to the first communication station that the reception sensor detected a high-power laser beam,
wherein the control device of the first communication station controls the high-power laser oscillator to output the high-power laser beam based on a specific pattern when receiving the first detection signal,
wherein the control device of the second communication station controls a communication laser oscillator to generate the second detection signal to inform to the first communication station that the reception sensor detected a change of the reception level of the high-power laser beam based on the specific pattern,
wherein the control device of the first communication station carries out a control to weaken the output level of the high-power laser beam step-by-step when receiving the second detection signal,
wherein the control device of the second communication station carries out a control to drop the transmittance of the light-attenuating filter step-by-step as the output level of the high-power laser beam is weakened, and
wherein the control device of the first communication station controls the high-power laser oscillator to carry out the high-speed communication by using the high-power laser beam which has a communication output level, when the output level of the high-power laser beam dropped to the communication output level.

11. The laser communication system according to claim 1, wherein the high-power laser oscillator further generates the communication laser beam used for the laser optical communication, and
wherein the first communication station further includes a control device configured to control an operation of the high-power laser oscillator.

12. A laser communication method of carrying out a laser beam communication in a laser communication system including a first communication station and a second communication station, comprising:
removing a solid body with a high-power laser beam generated by a high-power laser oscillator of the first communication station; and
carrying out the laser beam communication through a space blocked by the solid body between the first communication station and the second communication station.

13. The laser communication method according to claim 12, wherein the removing comprises protecting a reception sensor by a light-attenuating filter in the second communication station, before the first communication station irradiates the high-power laser beam, and
wherein the carrying out a laser beam communication comprises:
dropping the output level of the high-power laser beam in the first communication station, and
removing the light-attenuating filter from the reception sensor in the second communication station after detecting that the intensity level of the received laser beam dropped to the communication intensity level.

14. The laser communication method according to claim 13, wherein the dropping the output level comprises dropping the output level step-by-step, and wherein the removing the light-attenuating filter comprises raising the transmittance of the light-attenuating filter step-by-step.

15. The laser communication method according to claim 14, wherein the dropping the output level step-by-step comprises:
- transmitting from the second communication station, a detection signal indicating that the high-power laser beam is detected; and
- dropping the output level by a constant level, after the first communication station receives the detection signal.

16. The laser communication method according to claim 15, wherein the dropping the output level step-by-step comprises:
- changing the output level of the high-power laser beam based on a specific pattern in the first communication station;
- transmitting another detection signal indicating the detection of the specific pattern from the second communication station; and
- dropping the output level by the constant level in the first communication station after receiving said another detection signal, and
- wherein the raising the transmittance step-by-step comprises raising the transmittance by a constant level after detecting the specific pattern.

\* \* \* \* \*